US012574334B2

(12) United States Patent
Garg et al.

(10) Patent No.: US 12,574,334 B2
(45) Date of Patent: Mar. 10, 2026

(54) STAGGERED PAYLOAD RELAYER FOR PIPELINING DIGITAL PAYLOADS ACROSS NETWORK SERVICES

(71) Applicant: Chime Financial, Inc.

(72) Inventors: Bhashinee Garg, Oakland, CA (US); Alex Kleissner, San Francisco, CA (US); Bartlomiej Ogryczak, Concord, CA (US); David Lyons, Oakland, CA (US); Keerthi Nallani, Mountain House, CA (US); Matt Taylor, San Francisco, CA (US); Pengyue Li, Acton, MA (US); Peter Baker, Pacheco, CA (US); Renjie Xu, Fremont, CA (US)

(73) Assignee: Chime Financial, Inc., San Francisco, CA (US)

( * ) Notice: Subject to any disclaimer, the term of this patent is extended or adjusted under 35 U.S.C. 154(b) by 627 days.

(21) Appl. No.: 17/932,943

(22) Filed: Sep. 16, 2022

(65) Prior Publication Data

US 2024/0098036 A1 Mar. 21, 2024

(51) Int. Cl.
| | |
|---|---|
| *H04L 47/62* | (2022.01) |
| *H04L 12/28* | (2006.01) |
| *H04L 47/10* | (2022.01) |

(52) U.S. Cl.
CPC ...... *H04L 47/6225* (2013.01); *H04L 12/2859* (2013.01); *H04L 47/16* (2013.01)

(58) Field of Classification Search
CPC . H04L 47/6225; H04L 12/2859; H04L 47/16; H04L 65/80; H04L 47/24; H04L 47/12;
H04L 1/0007; H04L 69/04; H04L 65/65; H04L 47/10; H04L 47/36
See application file for complete search history.

(56) References Cited

U.S. PATENT DOCUMENTS

| | | | | |
|---|---|---|---|---|
| 10,680,945 | B1 * | 6/2020 | Ye | H04L 45/42 |
| 11,259,097 | B1 * | 2/2022 | Crawford | H04N 21/812 |
| 11,500,828 | B1 * | 11/2022 | Yu | G06F 16/2228 |
| 2007/0266386 | A1 * | 11/2007 | Kishan | G06F 9/4806 |
| | | | | 718/102 |

(Continued)

FOREIGN PATENT DOCUMENTS

| | | | | |
|---|---|---|---|---|
| CN | 101014134 A | * | 8/2007 | |
| CN | 101938775 A | * | 1/2011 | H04W 36/08 |
| JP | 2003204343 A | * | 7/2003 | H04L 12/4641 |

*Primary Examiner* — Atique Ahmed
(74) *Attorney, Agent, or Firm* — Keller Preece PLLC

(57) ABSTRACT

This disclosure describes a payload pipeline system that, as part of an inter-network facilitation system, can facilitate digital payload throughput between network components using a staggered payload relayer. For example, the disclosed systems utilize custom tooling to implement a staggered payload relayer as an intelligent conduit or pipeline that operates as a publisher-subscriber paradigm system (as opposed to a data stream system). In some cases, the disclosed systems can utilize synchronous or asynchronous communication to receive digital payloads for events from publisher network components and to make the digital payloads available within a payload queue maintained by the staggered payload relayer (for access by subscriber network components).

20 Claims, 12 Drawing Sheets

(56)         References Cited

U.S. PATENT DOCUMENTS

| 2010/0329216 A1* | 12/2010 | Jen ........................ H04W 36/08 |
| | | 370/332 |
| 2015/0131434 A1* | 5/2015 | Lee ........................ H04L 47/12 |
| | | 370/230 |
| 2016/0218951 A1* | 7/2016 | Vasseur ................... H04L 43/12 |
| 2018/0172765 A1* | 6/2018 | Rubin ..................... G06F 11/00 |
| 2019/0349871 A1* | 11/2019 | Ghosh ..................... H04B 7/155 |
| 2020/0065303 A1* | 2/2020 | Bhattacharjee ....... G06F 16/278 |
| 2021/0117425 A1* | 4/2021 | Rao ..................... H04L 41/0806 |

* cited by examiner

Synchronous - Single

| Threads | Avg. Payloads/sec |
|---------|-------------------|
| 1 | 50.3 |
| 2 | 111.16 |
| 3 | 171.22 |
| 4 | 220.52 |
| 6 | 323.62 |
| 8 | 418.41 |
| 10 | 490.44 |
| 12 | 520.94 |
| 16 | 532.14 |

702

Asynchronous - Single

176.14 Digital Payloads Per Second

704

Asynchronous with Concurrency

10,000 Digital Payloads Per Second

Receiving A Digital Payload For A Staggered Payload Relayer 802

Adding Digital Payload To Payload Queue 804

Identifying A Subscriber Network Component For The Digital Payload 806

Providing Digital Payload To The Subscriber Network Component 808

STAGGERED PAYLOAD RELAYER FOR PIPELINING DIGITAL PAYLOADS ACROSS NETWORK SERVICES

BACKGROUND

Recent cloud computing developments have led to improvements in networking systems that use interconnected servers to perform a wide variety of processes, from modifying digital images to predicting device behavior. For example, in response to a client device interaction requesting specific information at a client device, existing networking systems can perform large numbers of processes very quickly to generate and provide the requested information in an interactive fashion, in (near) real time. Despite recent advances, however, existing networking systems continue to exhibit a number of drawbacks or deficiencies, particularly with regard to efficiency and data integrity.

As just suggested, some existing networking systems are inefficient. In particular, to facilitate inter-network communication between various devices or services, many conventional systems operate under an event stream paradigm, where the systems broadcast constant data streams to make the streams (of digital payloads) accessible by the various devices/services that utilize the data. For example, an existing system receives a request from a client device to generate a new user account and, in response, the system generates a data stream to constantly broadcast data for an account generation event (e.g., user account credentials and client device information) so that one or more account generation services can access the data to generate the new user account. However, by broadcasting steady data streams for potentially large numbers of events and/or to large numbers of network components, prior systems consume an excessive amount of computer processing power in maintaining these data streams that could otherwise be preserved with a more efficient system.

As another example of their inefficiency, some prior networking systems utilize sizable databases to store digital payloads generated and used by various devices, servers, and components within the network. As these networks of interconnected services and devices grow larger and as more client devices interact with the systems to initiate events, the storage requirements for maintaining the data for the increasing number of digital payloads likewise increase in size. By storing such large amounts of information, however, these conventional systems require substantial amounts of computer memory that might otherwise be avoided.

Not only are some existing networking systems inefficient, but some networking systems also compromise data integrity. Particularly when passing data between various components or subsystems, many existing networking systems do so in an error-agnostic fashion, indifferent to the possibility of bugs or errors that could arise in one or more aspects of the system. For example, existing systems often generate and pass digital payloads from one network component to another without the capacity to track or monitor downstream activity of the digital payload. Consequently, some existing systems are difficult to debug and trouble-shoot to correct errors or remedy operational flaws. In some cases, because many existing systems have no way of accurately tracing digital payloads for debugging purposes, these systems are therefore susceptible to data loss or data corruption due either to accidental coding flaws or to malicious actors, not to mention the computationally intensive and inefficient debugging processes of these conventional systems.

These, along with additional problems and issues, exist with conventional networking systems.

SUMMARY

This disclosure describes one or more embodiments of methods, non-transitory computer-readable media, and systems that can solve the foregoing problems in addition to providing other benefits. Particularly, the disclosed systems can improve efficiency and data integrity by facilitating digital payload throughput between network components using a staggered payload relayer. For example, the disclosed systems utilize custom tooling to implement a staggered payload relayer as an intelligent conduit or pipeline that operates under a publisher-subscriber paradigm (as opposed to a data stream paradigm). In some cases, the disclosed systems can utilize a simple queue service ("SQS") to receive digital payloads for events (e.g., account generation events or funds transfer events) from publisher network components and to make the digital payloads available within a payload queue maintained by the staggered payload relayer. The disclosed systems can also utilize a simple notification service ("SNS") to facilitate providing (or granting access to) digital payloads within the payload queue for subscriber network components.

BRIEF DESCRIPTION OF THE DRAWINGS

The detailed description refers to the drawings briefly described below.

FIG. 7 illustrates example tables of experimental results for the payload pipeline system in accordance with one or more embodiments

DETAILED DESCRIPTION

Figure 1:
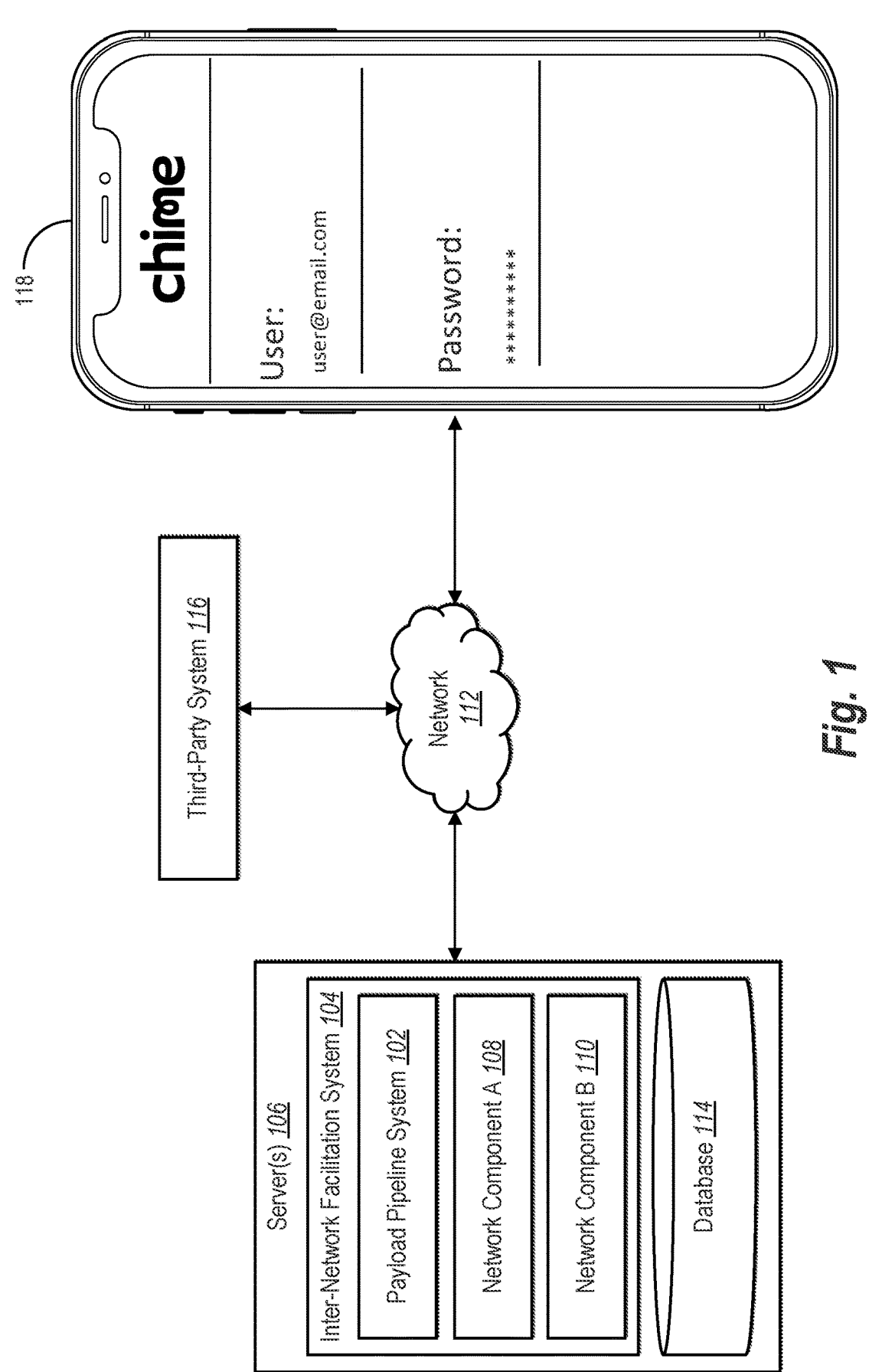
FIG. 1 illustrates a block diagram of an environment for implementing an inter-network facilitation system and a payload pipeline system in accordance with one or more embodiments.

This disclosure describes a payload pipeline system that can efficiently and accurately manage and distribute digital payloads across various network components of a network-based system. In practical scenarios, network-based systems often utilize multiple servers hosting multiple compartmentalized components, modules, or services (with shared or independent processor(s)) to perform respective functions, where each of the network components generates and receives different data to perform their respective functions as part of the overarching ecosystem. For instance, in response to a request from a client device to generate a new user account within a network-based system, the system uses several network components to perform the processes involved in generating the new user account, including: 1) ingesting the client device request, 2) generating a digital payload codifying the request into computer readable code, 3) passing the digital payload to an account generation engine, and 4) providing a confirmation message to the client device upon successful generation of the user account.

In many cases, several different network components are required to perform the many processes involved in seemingly simple events or tasks (e.g., generating a user account), and the number of processes and components grows especially large as more user accounts and client devices participate in the system to initiate events. Motivated by the challenge of efficiently managing these digital payloads, the payload pipeline system can utilize a staggered payload relayer that, through an intermittent message queue system (e.g., AMAZON WEB SERVICE's simple queue service or "SQS") and an intermittent message notification system (e.g., AMAZON WEB SERVICE's simple notification service or "SNS"), facilitates inter-component communication of digital payloads without requiring broadcast of a constant data stream.

As just mentioned, the payload pipeline system can utilize a staggered payload relayer to manage or relay digital payloads. To elaborate, the payload pipeline system can facilitate publication of, and subscription to, digital payloads for passing the digital payloads among various network components, software modules, or containerized service of an inter-network facilitation system. For example, the payload pipeline system uses the staggered payload relayer (as publisher-subscriber subsystem) to both receive digital payloads published by publisher network components and provide digital payloads to subscriber network components.

In some cases, the staggered payload relayer acts as an intelligent conduit or pipeline to funnel or relay digital payloads in this type of publisher-subscriber environment. For instance, the payload pipeline system utilizes the staggered payload relayer as (part of) an intermittent message queue system to facilitate publication of digital payloads within a payload queue. In addition, the payload pipeline system utilizes the staggered payload relayer as (part of) an intermittent message notification system to facilitate sub-scription to the published digital payloads included within the payload queue (as hosted by the staggered payload relayer).

In one or more embodiments, the payload pipeline system implements the staggered payload relayer within a particular ecosystem of containerized network components. For instance, the payload pipeline system utilizes an ecosystem hosted by a third-party server that includes application programming interfaces ("APIs") compatible with a variety of programming languages for creating and implementing containerized network components, including publisher network components and subscriber network components. In some embodiments, the payload pipeline system utilizes the AMAZON WEB SERVICES ("AWS") ecosystem to generate and utilize network components using particular operation and communication protocols for intermittent payload queuing and intermittent payload notifications. For example, the payload pipeline system implements intermittent payload queuing through the AWS Simple Queue Service ("SQS") to add digital payloads to a payload queue and make the digital payloads available to subscriber network components. In addition, the payload pipeline system implements intermittent payload/message notifications through the AWS Simple Notification Service ("SNS") to provide digital payloads to subscriber network components.

In utilizing the staggered payload relayer to relay digital payloads between network components, the payload pipeline system can perform synchronous payload transmission and/or asynchronous payload transmission. For synchronous (e.g., real time or near real time) payload transmission, the payload pipeline system can facilitate back-and-forth communication between network components, where a subscriber network component publishes a digital payload that is relayed to a payload topic on a staggered payload relayer. Upon publishing, the payload pipeline system waits until the payload topic replies to the publisher network component with a confirmation message (e.g., a confirmation of receipt of the digital payload) before proceeding to a subsequent task (e.g., relaying another digital payload). For asynchronous payload transmission, the payload pipeline system can facilitate a recipient-agnostic transmission of a digital payload. For example, the payload pipeline system utilizes the staggered payload relayer to host, or make available, a payload queue of digital payloads received from publisher network components. In turn, subscriber network components can access (as provided by the payload pipeline system) the published digital payloads in the queue. In the asynchronous scenario, the publisher network component is agnostic to, or does not consider, which (or how many or when) network components receive or utilize a digital payload, and the payload pipeline system does not wait for a confirmation message.

In some embodiments, the payload pipeline system facilitates concurrent asynchronous relay of digital payloads (even in programming languages where such functionality is notoriously difficult, such as RUBY). For example, the payload pipeline system can generate concurrent payload groups by combining multiple digital payloads from a digital queue together. The payload pipeline system can further provide the concurrent payload group to an intermittent message notification system (e.g., SNS) within a single transmission to distribute the digital payloads from the concurrent group to respective subscriber network components. Even though Ruby does not lend itself to concurrency, especially not when dealing with SQS and SNS, the payload pipeline system can nevertheless utilize its unique architecture to generate and distribute concurrent payload groups using SQS and SNS in Ruby, as described in further detail below with reference to the figures.

In one or more embodiments, the payload pipeline system facilitates improved debugging capability compared to prior systems. For example, the payload pipeline system can utilize the staggered payload relayer to customize digital payloads as they are relayed between network components for better trackability. In some cases, the payload pipeline system improves the tracing for digital payloads by generating metadata (e.g., payload annotations), such as debugger trackers, to use as tracers or markers for digital payloads as they travel between network components. Accordingly, the payload pipeline system can readily facilitate tracing a digital payload to identify causes for break points or errors at various subscription components, publication components, or other locations of use/transmission within an inter-network facilitation system.

As suggested above, the disclosed payload pipeline system provides several improvements or advantages over conventional networking systems. For example, the payload pipeline system can improve computing efficiency over prior systems. As opposed to prior systems that require broadcasting a digital event stream to facilitate a publisher-subscriber environment to pass digital payloads between network components, the payload pipeline system utilizes a staggered payload relayer for staggered or intermittent (as opposed to constantly streamed) queuing and transmission of digital payloads. Indeed, by utilizing one or more embodiments of a novel architecture of the staggered payload relayer (which is described in further detail below), the payload pipeline system avoids the need to constantly broadcast streams of events or digital payloads to make them accessible to subscriber network components. As a result of circumventing the need for event streams, the payload pipeline system preserves computer processing power wasted by prior systems that require such even streams.

As another example of the improved efficiency of the payload pipeline system, the payload pipeline system can further reduce the computer memory requirements of prior systems. For example, not only do many prior systems broadcast event streams for a publisher-subscriber setup, but prior systems also often require large databases dedicated to storing digital payloads for facilitating such event streams. The payload pipeline system, by contrast, utilizes a staggered payload relayer that uniquely includes no (dedicated) computer storage for storing digital payloads (or no more than a default temporary queue storage set by AWS). Instead, the staggered payload relayer maintains a payload queue that is constantly in flux as digital payloads are added by publisher network components and relayed to subscriber network components (and subsequently removed from the queue). Consequently, the payload pipeline system requires less computer memory for storing digital payloads compared to prior systems. The memory improvements are especially pronounced in larger network-based systems, where the numbers of digital payloads, payload transmissions, and network components is greater (and therefore requires even more memory in prior systems).

In addition to improving efficiency, the payload pipeline system can also improve data integrity over existing networking systems. While some existing network systems are prone to compromising the integrity of computer data through painstaking debugging caused by untraceable (or difficult-to-trace) payload transmissions, the payload pipeline system described herein utilizes a novel staggered payload relayer that can generate debugging wrappers for individual digital payloads. Indeed, before passing a digital payload between network components (or to a third-party system), the payload pipeline system can generate metadata markers in the form of debugging wrappers to link to, or associate with digital payloads for fast, efficient debugging and error correction. Thus, the payload pipeline system can determine and indicate sources, destinations, times, and uses for digital payloads to trace the payloads throughout the interconnected network components. By improving the traceability of digital components, the payload pipeline system can more effectively and more efficiently facilitate system debugging to preserve the integrity of computer data passed among network components of an inter-network facilitation system.

As indicated by the foregoing discussion, the present disclosure utilizes a variety of terms to describe features and advantages of the payload pipeline system. For example, as used herein, the term "inter-network facilitation system" refers to a system that facilitates digital communications across different computing systems over one or more networks. For example, an inter-network facilitation system manages financial information, such as credit accounts, funds transfers, loans, and secured accounts for a single user account registered within the inter-network facilitation system. In some cases, the inter-network facilitation system is a centralized network system that includes multiple network components for facilitating access to online banking accounts, credit accounts, and other accounts via a central network location. Indeed, the inter-network facilitation system can link accounts from different network-based financial institutions to provide information regarding, and management tools for, the different accounts.

Relatedly, as used herein, the term "network component" (or sometimes simply "component") refers to a computer application or subsystem operated by one or more processors (hosted by one or more servers) that are dedicated to a particular computer task or process. For example, a network component can be part of a larger network-based system and can be communicatively coupled (e.g., via a computer network) to other network components for passing data therebetween to form a networking environment of cooperating network components. A network component can perform one or more tasks associated with one or more applications (e.g., client device applications) that access an inter-network facilitation system. Thus, an inter-network facilitation system can include multiple (containerized) network components that each perform respective functions as subsystems within the system. In certain embodiments, a network component refers to a server running a specific process, where a publisher network component refers to a first server and a subscriber network component refers to a second server. In some cases, one network component receives and/or provides digital communications to a client device while another network component generates a digital payload for a request received from the client device (e.g., a request to generate a user account or a request to transfer funds to another user account) and yet another network component receives the digital payload to perform the requested function.

Indeed, a network component can refer to a "publisher network component" that generates and provides a digital payload to provide to a staggered payload relayer. Additionally (or alternatively), a network component can refer to a "subscriber network component" that receives a digital payload from the staggered payload relayer. Within a pipeline of functions to accomplish a task requested by a client device (e.g., to transfer funds between user accounts), the payload pipeline system can use multiple publisher network components and multiple subscriber network components to perform respective functions, where some network components are both publishers and subscribers as they receive digital payloads from upstream components and provide different digital payloads to downstream components. In some embodiments, a publisher network component generates a digital payload in a first format that refers to a structure, makeup, construction, arrangement, and/or organization of computer data recognizable and processable by a publisher network component. In the same or other embodiments, a subscriber network component requires or requests a digital payload in a second format that refers to a makeup, construction, arrangement, and/or organization of computer data recognizable and processable by a subscriber network component (e.g., where a target format may differ from a source format).

Relatedly, as used herein, the term "digital payload" refers to a collection or a package of computer data that is passable from one network component to another. As an example, a digital payload can include user account information, including a name, an email address, an account behavior log, an account balance, a social security number, a phone number, and/or other information. A digital payload can have a particular format such as a data table, a matrix, or a vector, that is generated by one network component and passed to another network component within an inter-network facilitation (or to a third-party system). In some cases, a digital payload includes computer data (e.g., in JavaScript Object Notation or "JSON" format) for performing a particular process or function.

As mentioned, in some embodiments, the payload pipeline system utilizes a staggered payload relayer to transmit or relay digital payloads from publisher network components to subscriber network components. As used herein, the term "staggered payload relayer" (or simply "payload relayer") refers to a computer program (or collection of computer programs), a computer program wrapper, or a tool that relays digital payloads from publisher network components to subscriber network components using a payload queue. For example, staggered payload relayer is executed or Implemented by one or more processors across one or more servers to intelligently relay digital payloads between network components by identifying network components subscribed to certain digital payloads and providing those digital payloads to the proper subscribed network components upon receiving the digital payloads from publisher network components. In some cases, a staggered payload relayer is staggered in the sense that it does not generate or broadcast a constant data stream, but instead generates and maintains a payload queue of digital payloads that are intermittently (e.g., not constantly as in a stream) received from network components, added to the queue, provided to network components, and removed from the queue. Indeed, the payload pipeline system can implement a staggered payload relayer using an intermittent message queue system (e.g., SQS) and an intermittent message notification system (e.g., SNS).

In one or more described embodiments, the payload pipeline system generates a payload schema that is annotatable with schema annotations. As used herein, the term "schema annotation" (or sometimes simply "annotation") refers to a computerized indicator or digital flag that accompanies a payload schema and that designates all or part of the payload schema (or a digital payload) for a particular purpose. For example, a schema annotation can designate one or more parameter fields of a digital payload as containing sensitive data such as personally identifiable information. As another example, a schema annotation can designate a destination for a digital payload—e.g., to a subscriber network component or to a third-party system external to the inter-network facilitation system. In some cases, the payload pipeline system generates a schema annotation at the file level (e.g., within a digital file included as part of a digital payload), the field level (e.g., within a specified parameter field of a digital payload), or the payload level (e.g., as universally applied to all fields of the digital payload).

In some cases, the payload pipeline system can generate a concurrent payload group for performing concurrent transmission of multiple digital payloads in a single message or a single transmission. As used herein, a "concurrent payload group" refers to a group or collection of multiple digital payloads that are provided or transmitted together in a single communication. For example, a concurrent payload group includes multiple digital payloads (e.g., from multiple containerized workers of the staggered payload relayer) that are grouped together and concurrently or simultaneously provided to network components (or to an intermittent message notification system such as SNS for distribution to respective network components).

As mentioned, the payload pipeline system can improve debugging by generating specialized metadata to tie to digital payloads in the form of debugging wrappers. As used herein, the term "debugging wrapper" refers to specialized metadata for tracking a digital payload. For example, a debugging wrapper can include metadata that enables tracing or tracking a digital payload through various stages, including: i) to indicate its source as a particular publisher network component, ii) to indicate a payload queue on the staggered payload relayer where the digital payload is added, iii) to indicate an intermittent messaging notification system (e.g., SNS) used to transmit the digital payload, and iv) to indicate one or more subscriber network components that consume the digital payload.

In some embodiments, the payload pipeline system can generate digital payloads using machine learning models and/or for providing to machine learning models (e.g., to perform various tasks within the inter-network facilitation system). As used herein, the term "machine learning model" refers to a computer algorithm or a collection of computer algorithms that automatically improve for a particular task through experience based on use of data. For example, a machine learning model can utilize one or more learning techniques to improve in accuracy and/or effectiveness. Example machine learning models include various types of decision trees, support vector machines, Bayesian networks, linear regressions, logistic regressions, random forest models, or neural networks (e.g., deep neural networks).

Relatedly, the term "neural network" refers to a machine learning model that can be trained and/or tuned based on inputs to determine classifications or approximate unknown functions. In particular, the term neural network can include a model of interconnected artificial neurons (e.g., organized in layers) that communicate and learn to approximate complex functions and generate outputs (e.g., determinations of digital image classes) based on a plurality of inputs provided to the neural network. In addition, a neural network can refer to an algorithm (or set of algorithms) that implements deep learning techniques to model high-level abstractions in data.

Additional detail regarding the payload pipeline system will now be provided with reference to the figures. In particular, FIG. 1 illustrates a block diagram of a system environment for implementing a payload pipeline system 102 in accordance with one or more embodiments. As shown in FIG. 1, the environment includes server(s) 106 housing the payload pipeline system 102 as part of an inter-network facilitation system 104. The environment of FIG. 1 further includes a client device 118, a database 114 (e.g., located on the server(s) 106 or elsewhere), and a third-party system 116. In some embodiments, the environment includes additional systems connected to the payload pipeline system 102, such as a web hosting system (e.g., AMAZON WEB SERVICES), a credit processing system, an ATM system, or a merchant card processing system. The server(s) 106 can include one or more computing devices to implement the payload pipeline system 102. Additional description regarding the illustrated computing devices (e.g., the server(s) 106, the client device 118, the third-party system 116, and/or the database 114) is provided with respect to FIGS. 9-10 below.

As shown, the payload pipeline system 102 utilizes the network 112 to communicate with the client device 118, the third-party system 116, and/or the database 114 (and/or between network component A 108 and network component B 110). The network 112 may comprise any network described in relation to FIGS. 9-10. For example, the payload pipeline system 102 communicates with the client device 118 to provide and receive information pertaining to user accounts, financial transactions, account balances, funds transfers, or other information. Indeed, the inter-network facilitation system 104 or the payload pipeline system 102 can facilitate communication between various systems and client devices for performing network-based transactions. For example, payload pipeline system 102 or the inter-network facilitation system 104 can transfer funds between user accounts or can utilize machine learning models to generate predictions for transaction success, predictions for transfer amount limits, or predictions for advanced trust-based account balances (e.g., amounts based on historical user account behavior and previous balances).

To facilitate the functions of the inter-network facilitation system 104, in some embodiments, the payload pipeline system 102 communicates with different network components of the inter-network facilitation system 104, such as the network component A 108 and the network component B 110 (as well as the third-party system 116, and/or the database 114). More specifically, the payload pipeline system 102 generates and passes digital payloads between the network component A 108 and the network component B 110. Indeed, the payload pipeline system 102 can utilize the network component A 108 as a publisher network component to generate a digital payload in a first format. In turn, the payload pipeline system 102 can also utilize the network component B 110 as a subscriber network component to receive and process the digital payload in a second format.

As indicated by FIG. 1, the client device 118 includes a client application. In many embodiments, the inter-network facilitation system 104 or the payload pipeline system 102 communicates with the client device 118 through the client application to, for example, receive and provide information including data pertaining to user actions for logins, account registrations, credit requests, transaction disputes, or online payments (or other client device information). In addition, the payload pipeline system 102 generates digital payloads from requests obtained from the client device 118 and generates displayable information from digital payloads to provide to the client device 118 in return (e.g., after utilizing multiple network components to process the digital payloads to perform a network task such as generating a new user account or transferring funds between user accounts).

As indicated above, the inter-network facilitation system 104 or the payload pipeline system 102 can provide (and/or cause the client device 118 to display or render) visual elements within a graphical user interface associated with the client application. For example, the inter-network facilitation system 104 or the payload pipeline system 102 can provide a graphical user interface that includes a login screen and/or an indication of successful or unsuccessful login. In some cases, the payload pipeline system 102 provides user interface information for a user interface for performing a different user action such as an account registration, a credit request, a transaction dispute, or an online payment. In some embodiments, the payload pipeline system 102 determines where a user action (e.g., a login, a funds transfer, or a trust-based advance account amount increase) is successful and/or permissible based on various account data and/or machine learning predictions.

Although FIG. 1 illustrates the environment having a particular number and arrangement of components associated with the payload pipeline system 102, in some embodiments, the environment may include more or fewer components with varying configurations. For example, in some embodiments, the inter-network facilitation system 104 or the payload pipeline system 102 can communicate directly with the client device 118, the third-party system 116, and/or the database 114, bypassing the network 112. In these or other embodiments, the inter-network facilitation system 104 or the payload pipeline system 102 can be housed (entirely on in part) on the client device 118. Additionally, the inter-network facilitation system 104 or the payload pipeline system 102 can include (e.g., house) the database 114. Further, the inter-network facilitation system 104 can include more network components communicatively coupled together.

Figure 2:
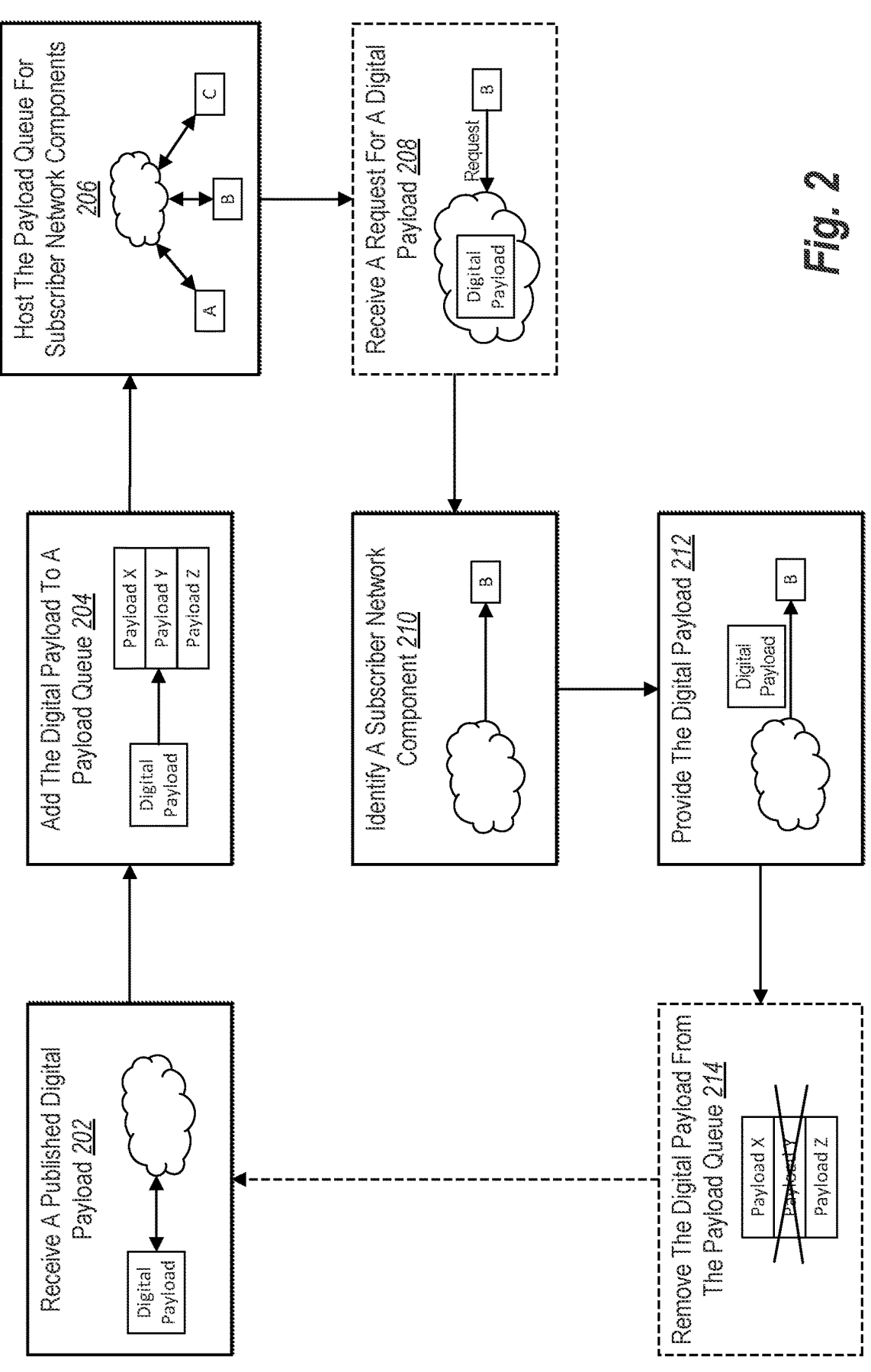
FIG. 2 illustrates an example overview of utilizing a staggered payload relayer to relay digital payloads from publisher network components to subscriber network components in accordance with one or more embodiments.

As mentioned, in certain embodiments, the payload pipeline system 102 can manage digital payloads for passing between network components utilizing a staggered payload relayer. In particular, the payload pipeline system 102 can receive digital payloads from publisher network components and can provide the digital payloads to subscriber network components. Indeed, the payload pipeline system 102 can relay digital payloads from potentially large numbers of publisher network components to potentially large numbers of subscriber network components. The payload pipeline system 102 can also balance publications and subscriptions to prevent overloading a payload queue (e.g., where publications outnumber/outpace subscriptions to fill up the queue) and to prevent large numbers of empty receives (e.g., where the queue is empty because subscriptions outnumber/outpace publications) by subscriber network components. FIG. 2 illustrates an overview of facilitating throughput of digital payloads using a staggered payload relayer in accordance with one or more embodiments. Additional detail regarding the various acts of FIG. 2 is provided thereafter with reference to subsequent figures.

As illustrated in FIG. 2, the payload pipeline system 102 performs an act 202 to receive a published digital payload. In particular, the payload pipeline system 102 receives a digital payload published by a publisher network component. For example, the payload pipeline system 102 receives the digital payload at a staggered payload relayer that manages the digital payload (together with other digital payloads received from other network components). In some cases, the digital payload includes information for a particular event or process, such as generating a new user account within the inter-network facilitation system 104, making a deposit to a user account, making a withdrawal from a user account, or transferring funds between user accounts. Indeed, the digital payload can include user account information (e.g., for sending and/or receiving accounts), timing information, fund amount information, or other information associated with performing the transaction or event.

In some embodiments, the payload pipeline system 102 detects a network event by determining one or more actions or processes performed by a client device and/or a network component. Example events include an authorization event (e.g., authorization for a funds transfer), a settlement event, an account generation event, an account balance change event, or some other event. In some cases, the payload pipeline system 102 detects an event by detecting an event identifier associated with an event and defining the event within the inter-network facilitation system 104.

To illustrate, in processing network transactions, there are often a variety of different events that occur in updating digital accounts to reflect asset modifications. These events are often executed at different times using different network components. The events can correspond to digital transmissions that come from a variety of different computer networks, over a variety of different times, and using a variety of individual digital payloads. Accordingly, as downstream network components need to access information regarding events such as asset modifications, these network components utilize computer resources for transferring the pertinent information for executing the events.

As further illustrated in FIG. 2, the payload pipeline system 102 performs an act 204 to add the digital payload to a payload queue. More specifically, the payload pipeline system 102 utilizes the staggered payload relayer to add the digital payload to a payload topic which can pass the digital payload to one or more (subscriber-component-specific) payload queues. The payload topic and/or the payload queue(s) can include a number of digital payloads received from various publisher network components (e.g., related to different events). In some cases, the payload pipeline system 102 adds digital payloads to the payload queue in chronological order as they are received. In certain embodiments, the payload pipeline system 102 manages the payload queue in an ordered fashion (although strict order may not be guaranteed) even as the payload queue is housed across multiple servers or machines. As shown, the payload queue includes three digital payloads: Payload X, Payload Y, and Payload Z.

Additionally, the payload pipeline system 102 performs an act 206 to host the payload queue for subscriber network components. To elaborate, the payload pipeline system 102 hosts the payload queue to make the digital payloads within the payload queue available to subscriber components. In some cases, the payload pipeline system 102 does not stream the digital payloads (e.g., as a constant data stream broadcast to subscriber network components) but rather hosts the digital payloads (via an intermittent message queue system) in the payload queue so that subscriber components can access them. For example, the payload pipeline system 102 uses the staggered payload relayer to manage the payload queue and to indicate which digital payloads are within the queue so that corresponding network components subscribed to those digital payloads can retrieve or access them (or the staggered payload relayer can provide them). As shown, the payload pipeline system 102 hosts the payload queue for access by three subscriber network components: subscriber network component A, subscriber network component B, and subscriber network component C.

As also illustrated in FIG. 2, in certain embodiments, the payload pipeline system 102 performs an act 208 to receive a request for a digital payload. For example, the payload pipeline system 102 receives a request from a subscriber network component to access a particular digital payload (within the payload queue of the staggered payload relayer) to which the network component is subscribed. For instance, a subscriber network component that performs a particular process, such as transferring funds from one user account to another, requests a digital payload that includes funds transfer information, including user account information, funds amount information, and other data necessary to execute the funds transfer event. As shown, the payload pipeline system 102 receives a request from subscriber component B to access a digital payload from the staggered payload relayer. In some embodiments, however, the payload pipeline system 102 does not perform the act 208 and does not receive a request for a digital payload. Instead, the payload pipeline system 102 relays digital payloads from the payload queue to subscriber network components without receiving express requests for the digital payloads.

Along these lines, in one or more embodiments, the payload pipeline system 102 performs an act 210 to identify a subscriber network component. More particularly, the payload pipeline system 102 identifies a subscriber network component that is subscribed to, or associated with, a digital payload within the payload queue of the staggered payload relayer. In some embodiments, the payload pipeline system 102 receives an indication of a subscriber network component from an administrator device (e.g., associated with an administrator or engineer). For example, the payload pipeline system 102 identifies a subscriber network component in response to receiving a request for a digital payload (e.g., as the subscriber network component that submits the request). As another example, the payload pipeline system 102 identifies a subscriber network component by determining a network component that is designated as a destination for, or subscribed to receive, a particular digital payload within the payload queue.

Indeed, the payload pipeline system 102 identifies subscriber components that subscribe to particular digital payloads (e.g., that are designated or assigned specific digital payloads for an event). In some cases, the payload pipeline system 102 identifies metadata (e.g., a subscriber component designation) associated with a digital payload to determine a network component subscribed to the digital payload. In one or more embodiments, the payload pipeline system 102 analyzes subscriber network components to determine or indicators that designate one or more digital payloads to which the network components are subscribed. As shown, the payload pipeline system 102 identifies the subscriber network component B as a network component subscribed to a certain digital payload from the payload queue.

As further illustrated in FIG. 2, the payload pipeline system 102 performs an act 212 to provide a digital payload to a subscriber network component. In particular, the payload pipeline system 102 utilizes a staggered payload relayer to provide a digital payload from a payload queue to a subscriber network component that is subscribed to the digital payload. In some cases, the payload pipeline system 102 provides the digital payload by transmitting payload data over a network (e.g., the network 112) to the subscriber network component. By providing the digital payload from the payload queue to the subscriber network component, the payload pipeline system 102 facilitates performing or executing an event (e.g., generating a user account or transferring funds between user accounts. In certain embodiments, the payload pipeline system 102 provides the digital payload to a subscriber network component in the form of a machine learning model to execute an event by generating a prediction (e.g., a predicted probability of success for a funds transfer or a predicted amount for a trust-based advance account).

As shown, in one or more embodiments, the payload pipeline system 102 further performs an act 214 to remove a digital payload from the payload queue. To elaborate, in response to providing a digital payload to a subscriber network component using a staggered payload relayer, the payload pipeline system 102 removes the digital payload from the payload queue of the staggered payload relayer. For example, the payload pipeline system 102 queues a digital payload into the payload queue upon receiving the digital payload from a publisher network component (e.g., as in the act 202) and dequeues the digital payload from the payload queue upon providing the digital payload to a subscriber network component.

In certain embodiments, digital payloads are for a single use or are specific to a single event, and the payload pipeline system 102 determines a pair of network components (e.g., a publisher-subscriber component pair) that perform the event. Thus, upon providing the digital payload or upon executing the event for the digital payload, the payload pipeline system 102 determines that the digital payload has expired and removes a digital payload (as it is consumed by the subscriber network component). As shown, the payload pipeline system 102 provides Payload Y to a subscriber network component, and the payload pipeline system 102 thus removes Payload Y from the payload queue.

In one or more implementations, the payload pipeline system 102 repeats the acts illustrated in FIG. 2. For example, the payload pipeline system 102 repeats the acts for individual events performed by the payload pipeline system 102 or by the inter-network facilitation system 104. Thus, for each event that requires passing a digital payload from a publisher network component to a subscriber network component, the payload pipeline system 102 utilizes a staggered payload relayer to perform the acts of FIG. 2.

Figure 3A:
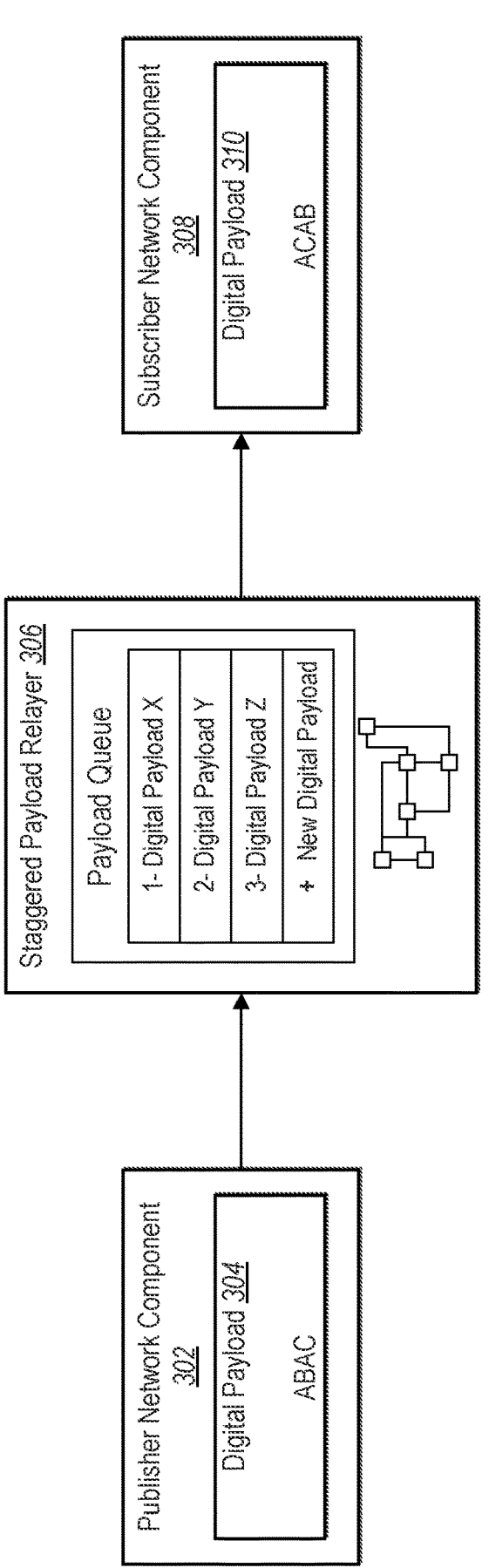
FIG. 3A illustrates an example diagram for utilizing a staggered payload relayer to manage a payload queue in accordance with one or more embodiments.

As mentioned above, in certain described embodiments, the payload pipeline system 102 utilizes a staggered payload relayer to facilitate throughput of digital payloads. In particular, the payload pipeline system 102 receives published digital payloads to add to a payload queue of the staggered payload relayer and provides queued digital payloads to subscriber network components. FIG. 3A illustrates relaying a digital payload using a staggered payload relayer in accordance with one or more embodiments.

As illustrated in FIG. 3A, the payload pipeline system 102 utilizes a staggered payload relayer 306 to manage a payload queue (or multiple payload queues corresponding to a payload topic). More particularly, the payload pipeline system 102 intermittently receives digital payloads sent by publisher network components for distribution to subscriber network components. For example, the payload pipeline system 102 receives the digital payload 304 from the publisher network component 302. As shown, the digital payload 304 has a particular data format of "ABAC," although this is merely illustrative, and digital payloads can have much more complex formats such as data tables, vectors, embeddings, or other formats represented by computer code.

Upon receiving the digital payload 304, the staggered payload relayer 306 adds the digital payload 304 to the payload queue. More particularly, the staggered payload relayer 306 adds the digital payload 304 to a payload topic (e.g., an SNS topic) specific to the instance of the staggered payload relayer 306. In addition, the staggered payload relayer 306 utilizes the payload topic to communicate the digital payload 304 to one or more payload queues maintained by the staggered payload relayer 306 for respective subscriber network components. Additional detail regarding the payload topic and the architecture of the staggered payload relayer 306 is provided below with reference to subsequent figures.

In some embodiments, the payload queue can include digital payloads received from the publisher network component 302 and/or other network components (e.g., within the inter-network facilitation system 104). In some cases, the staggered payload relayer 306 maintains digital payloads within the payload queue for a set duration (e.g., a 14-day retention policy), as dictated by an intermittent message queue system used by (or that hosts) the staggered payload relayer 306 (e.g., as set by the SQS provided by AWS). To elaborate, the payload pipeline system 102 uses an intermittent message queue system to queue digital payloads as they are received, without broadcasting or streaming the digital payloads to downstream components.

As also shown in FIG. 3A, the payload pipeline system 102 provides a digital payload 310 to a subscriber network component 308. In some cases, the digital payload 310 is a converted or translated version of the digital payload 304. That is, the digital payload 310 includes all or some of the same information as the digital payload 304, but in a different data format. Indeed, the payload pipeline system 102 can utilize the staggered payload relayer 306 to relay the digital payload 304 from the publisher network component 302 to the subscriber network component 308 in a format that is usable by the subscriber network component 308 to execute one or more processes for an event (e.g., by translating via a particular schema or payload translation tool).

The payload pipeline system 102 can utilize the staggered payload relayer 306 as a piece of computer code, executed as a background process, to add digital payloads to and read digital payloads from the payload queue (or from multiple different payload queues). Indeed, as mentioned above, staggered payload relayer 306 can act as a sort of conduit to consume information from one network component and make it available at another network component to accomplish a process for an event. The payload pipeline system 102 can also use multiple instances or clients of the staggered payload relayer 306, where each instance/client is for a different computer programming language (e.g., RUBY, PYTHON, and GO). In some cases (regardless of the respective programming language), the staggered payload relayer 306 generates a digital payload in a guaranteed format (e.g., a protocol buffer or "PROTOBUF" format) for compatibility across network components. As shown, the digital payload 310 has a format of "ACAB," which differs from the format of the digital payload 304.

To provide the digital payload 310 to the subscriber network component 308, the staggered payload relayer 306 utilizes an intermittent message notification system, such as the SNS provided by AWS. To elaborate, the staggered payload relayer 306 intermittently provides queued digital payloads to network components subscribed or designated as recipients of respective digital payloads. Indeed, by using the intermittent message notification system, the staggered payload relayer 306 need not constantly stream digital payloads, but the staggered payload relayer 306 instead identifies which network components subscribe to which queued digital payloads and transmits (e.g., via SNS) the digital payloads accordingly (e.g., on an individual, as-needed basis). The staggered payload relayer 306 is thus more lightweight and efficient than prior systems that require event streams to relay payloads, such as systems reliant on KAFKA or KINESIS.

In some embodiments, the payload pipeline system 102 utilizes the staggered payload relayer 306 for synchronous transmission of the digital payload 310. To elaborate, the payload pipeline system 102 translates the digital payload 304 into the digital payload 310 to provide a payload topic on the staggered payload relayer 306. The payload pipeline system 102 further waits for a confirmation message from the payload topic to relay back to the publisher network component 302 to verify successful transmission of the digital payload 304 (before permitting further processing). Accordingly, in these cases, the payload pipeline system 102 waits for confirmation messages from subscriber network components before proceeding to transmit additional digital payloads and/or before proceeding to execute processes for an event (e.g., an event associated with the digital payload 304 and/or the digital payload 310).

In one or more embodiments, the payload pipeline system 102 utilizes the staggered payload relayer 306 for asynchronous transmission of the digital payload 310. To elaborate, the payload pipeline system 102 receives the digital payload 304 and hosts the digital payload 304 within the payload queue without consideration for which network components or how many network components consume the digital payload downstream (or when transmission occurs). For instance, the payload pipeline system 102 hosts payload queue and provides digital payloads from the queue to subscriber network components in response to requests and/or based on identifying subscriber network components corresponding to the digital payloads (e.g., agnostic to the timing of transmission, the number of subscriber network components, or identifications of the subscriber components).

In certain embodiments, the payload pipeline system 102 utilizes multiple different staggered payload relayers, or multiple instances (or containerized workers) of the staggered payload relayer 306. For example, the payload pipeline system 102 utilizes different instances of the staggered payload relayer 306 to manage different payload queues, where each payload queue is associated with a different topic. In some cases, each instance of the staggered payload relayer 306 is associated with its own topic or its own event. For instance, the payload pipeline system 102 can dedicate an instance of the staggered payload relayer 306 to handle user account generation and can dedicate another instance to handle funds transfers.

In one or more implementations, the payload pipeline system 102 utilizes the staggered payload relayer 306 to manage digital payloads for large numbers of publisher and subscriber network components. The staggered payload relayer 306 includes coding or programming to intelligently manage publication volume and subscription volume across the various network components to prevent a backlog of digital payloads within the payload queue and to prevent (large numbers of) empty receives. For instance, the payload pipeline system 102 prevents backlogs from building on the queue by providing digital payloads to subscriber network components (and removing them from the queue) at a rate that meets or exceeds a rate of adding published digital payloads to the queue. On the other side of the equation, the payload pipeline system 102 also prevents a threshold number of empty requests from occurring by throttling the rate of providing digital payloads to subscriber network components according to a rate of adding digital payloads to the queue (e.g., to match or only exceed by a certain margin).

As mentioned, the payload pipeline system 102 uses the staggered payload relayer 306 to receive the digital payload 304 from the publisher network component 302. In some cases, the communication between the staggered payload relayer 306 and the publisher network component can be represented by the following pseudo code:

```
require 'hawker'
require 'hawker/vendor/ping_message_v1'
message = PingMessageV1.new(message: 'hello there')
Hawker::Publisher.publish(message)
``` where "message" represents the digital payload 304.

In addition, the payload pipeline system 102 uses the staggered payload relayer 306 to provide the digital payload 310 to the subscriber network component 308. In some cases, the communication between the staggered payload relayer 306 and the publisher network component can be represented by the following pseudo code:

```
require 'hawker/worker'
class PingWorker
    include Chime::Hawker::Subscriber::Worker
    subscriber_options queue: 'ping-message-v1'
    def perform (object)
        puts object.message # -> 'Hello there'
        puts object.class # -> PingMessageV1
    end
end.
```

Figure 3B:
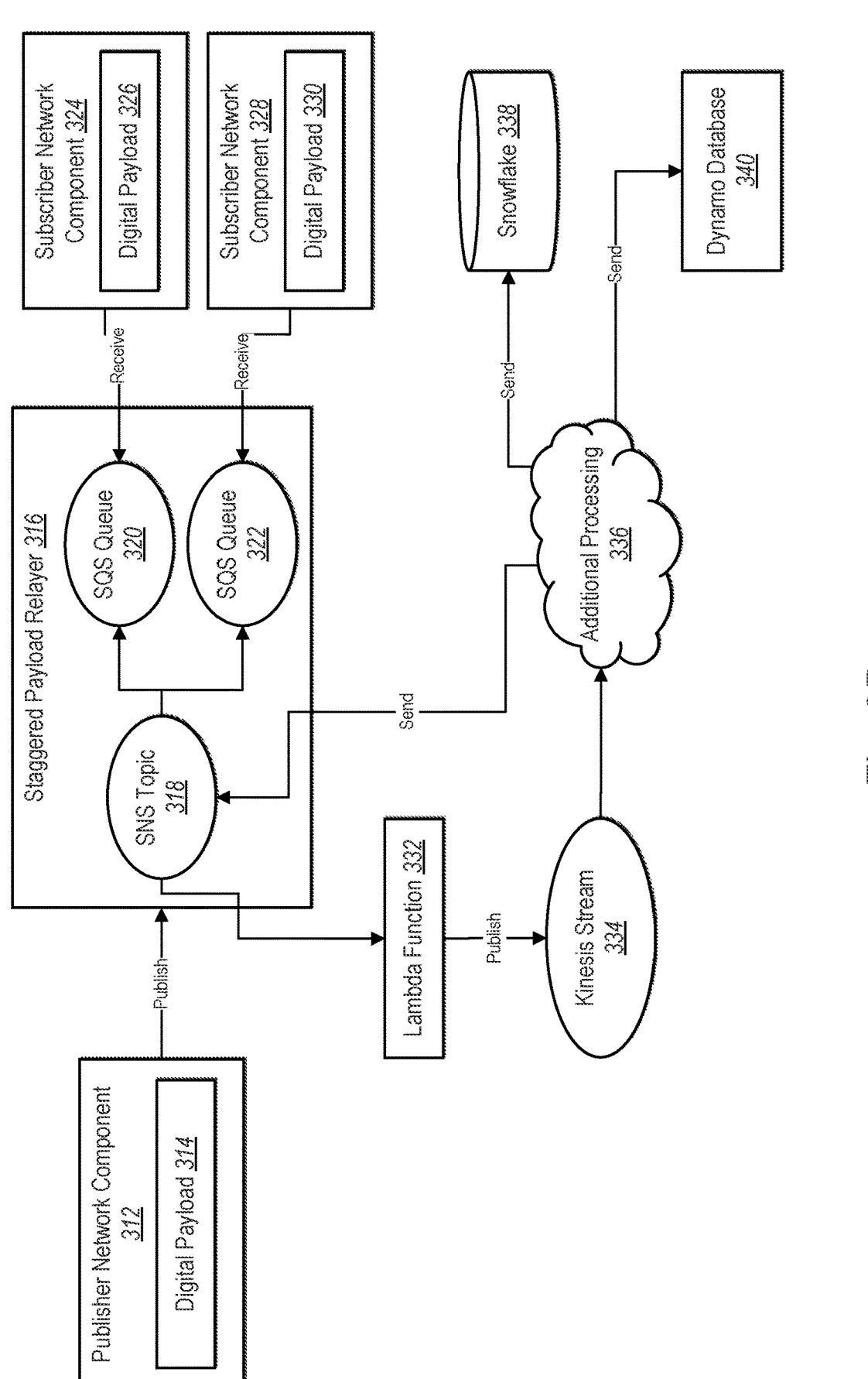
FIG. 3B illustrates an example diagram of a network component environment for a staggered payload relayer in accordance with one or more embodiments.

As mentioned, in one or more embodiments, the payload pipeline system 102 utilizes a staggered payload relayer to relay digital payloads to subscriber network components and to publish digital payloads to an event stream. FIG. 3B illustrates an example environment for utilizing a staggered payload relayer to relay and publish digital payloads in accordance with one or more embodiments.

As illustrated in FIG. 3B, the payload pipeline system 102 communicates with a publisher network component 312 to receive a digital payload 314. In particular, the publisher network component 312 publishes the digital payload 314 to pass the digital payload to a staggered payload relayer 316. As shown, the staggered payload relayer 316 includes an SNS topic 318 (or a payload topic of another type) dedicated to the publisher network component 312 (where other publisher network components will have their own dedicated topics and/or instances of the staggered payload relayer 316). Indeed, in some cases, a single instance of the staggered payload relayer 316 has its own SNS topic 318, and other instances have their own respective topics as well (as dictated by SNS protocols of AWS). Thus, the staggered payload relayer 316 receives the digital payload 314 and adds the digital payload 314 to the SNS topic 318. By using the SNS topic 318 in this fashion, the payload pipeline system 102 can utilize a single publish action (from the publisher network component 312 to the staggered payload relayer 316) to then fan out to multiple different network components, data streams, or other systems without requiring separate publishes for each communication of a digital payload.

In addition, the staggered payload relayer 316 can relay the digital payload 314 to one or more SQS queues (or payload queues of other types), such as the SQS queue 320 and the SQS queue 322. For instance, the payload pipeline system 102 can communicate with AWS to transfer digital payloads from the SNS topic 318 onto each SQS queue of the staggered payload relayer 316. Indeed, as shown, the payload pipeline system 102 utilizes the staggered payload relayer 316 to maintain an SQS queue for each respective subscriber network component. For example, the staggered payload relayer 316 includes an SQS queue 320 for the subscriber network component 324 and further includes the SQS queue 322 for the subscriber network component 328. Thus, the staggered payload relayer 316 can pass digital payloads (e.g., the digital payload 314) from the SNS topic 318 to the SQS queue 320 and/or the SQS queue 322. In turn, the staggered payload relayer 316 can further pass a digital payload (e.g., the digital payload 326) from the SQS queue 320 to the subscriber network component 324. The staggered payload relayer 316 can also pass the digital payload 330 from the SQS queue 322 to the subscriber network component 328.

In certain described embodiments, the payload pipeline system 102 can also utilize the staggered payload relayer 316 to publish digital payloads to a data stream. For example, the payload pipeline system 102 utilizes the SNS topic 318 to pass the digital payload 314 to a lambda function 332 for converting digital payload 314 (and/or other digital payloads) into a format compatible with a KINESIS stream 334. From the KINESIS stream 334, the payload pipeline system 102 can broadcast digital payloads to various network components and/or for additional processing 336. Such additional processing 336 can include converting digital payloads for transmitting to a payload database, such as SNOWFLAKE 338 and/or for transmitting to an AMAZON Dynamo database 340. Additional detail regarding publishing digital payloads to a data stream is provide below with reference to subsequent figures.

Figure 3C:
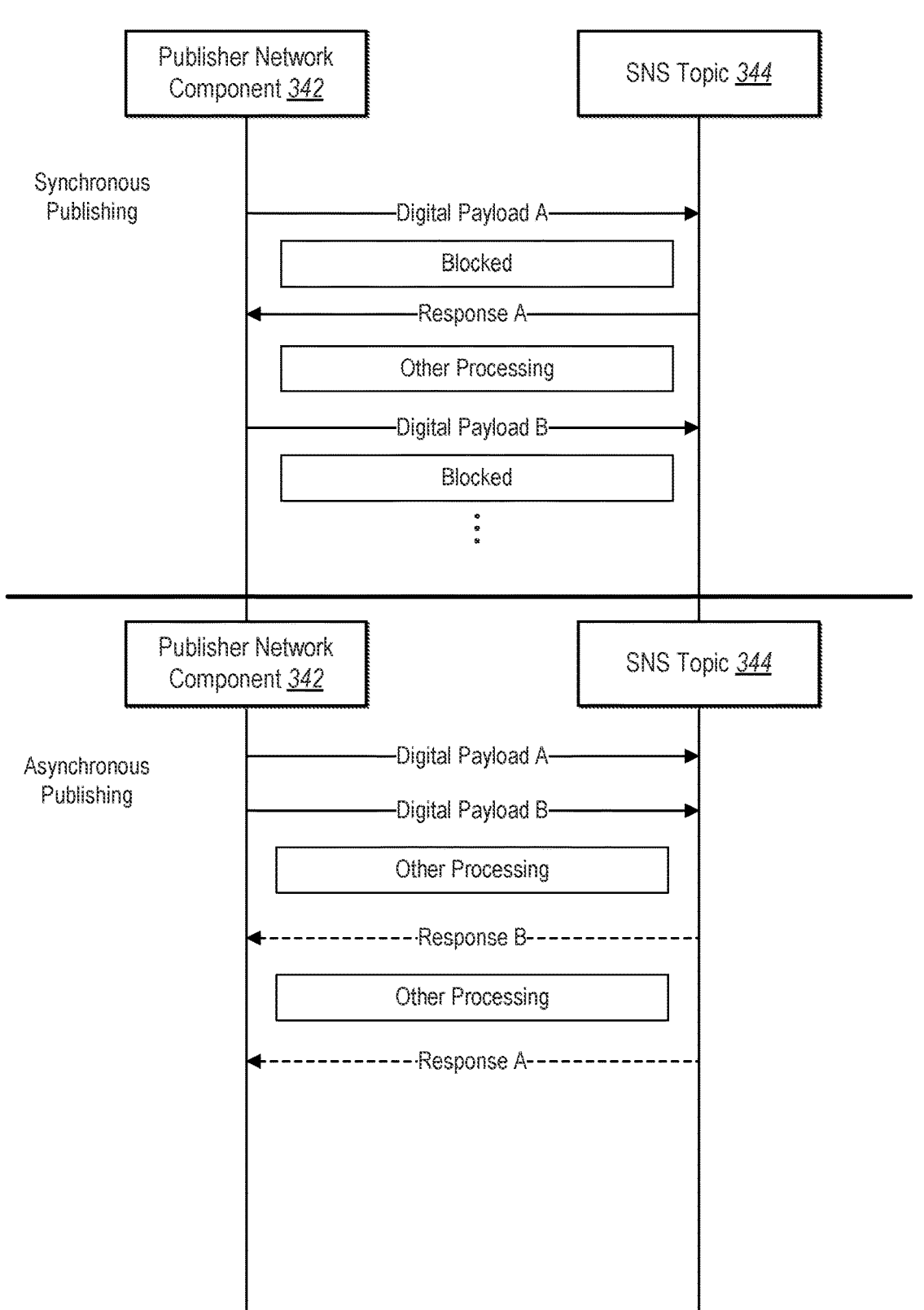
FIG. 3C illustrates an example diagram of synchronous and asynchronous communication of digital payloads in accordance with one or more embodiments.

As mentioned, in one or more embodiments, the payload pipeline system 102 can perform synchronous relaying of digital payloads and/or asynchronous relaying of digital payloads. FIG. 3C illustrates an example diagram for performing synchronous and asynchronous relaying of digital payloads in accordance with one or more embodiments.

As illustrated in FIG. 3C, the payload pipeline system 102 facilitates synchronous transmission of digital payloads. To elaborate, the payload pipeline system 102 receives, at an SNS topic 344 of a staggered payload relayer, a digital payload (e.g., digital payload A) from a publisher network component 342. The payload pipeline system 102 further blocks or prevents further action or processing in relation to digital payload A until the SNS topic 344 sends a response or a confirmation message (e.g., response A) to the publisher network component 342 in return. Upon determining that the SNS topic 344 provides response A confirming receipt of digital payload A, the payload pipeline system 102 permits other processing to take place. For further digital payloads, such as digital payload B, the payload pipeline system 102 performs similar functions to block additional processing or utilization of digital payload B until a confirmation message is sent from the SNS topic 344 to the publisher network component 342.

As further illustrated in FIG. 3C, the payload pipeline system 102 facilitates asynchronous transmission of digital payloads. To elaborate, the payload pipeline system 102 facilitates transmission of digital payload A and digital payload B from the publisher network component 342 to the SNS topic 344 without requiring confirmation messages or responses from the SNS topic 344. Indeed, some computer languages, such as RUBY, do not support asynchronous payloads out of the box and instead require modification. To this end, the payload pipeline system 102 utilizes concurrent RUBY API to enable asynchronous publishing of digital payloads. As shown, the payload pipeline system 102 facilitates additional processing for digital payload A and/or digital payload B before receiving (or without ever receiving) response A and/or response B for each respective digital payload.

Figure 4:
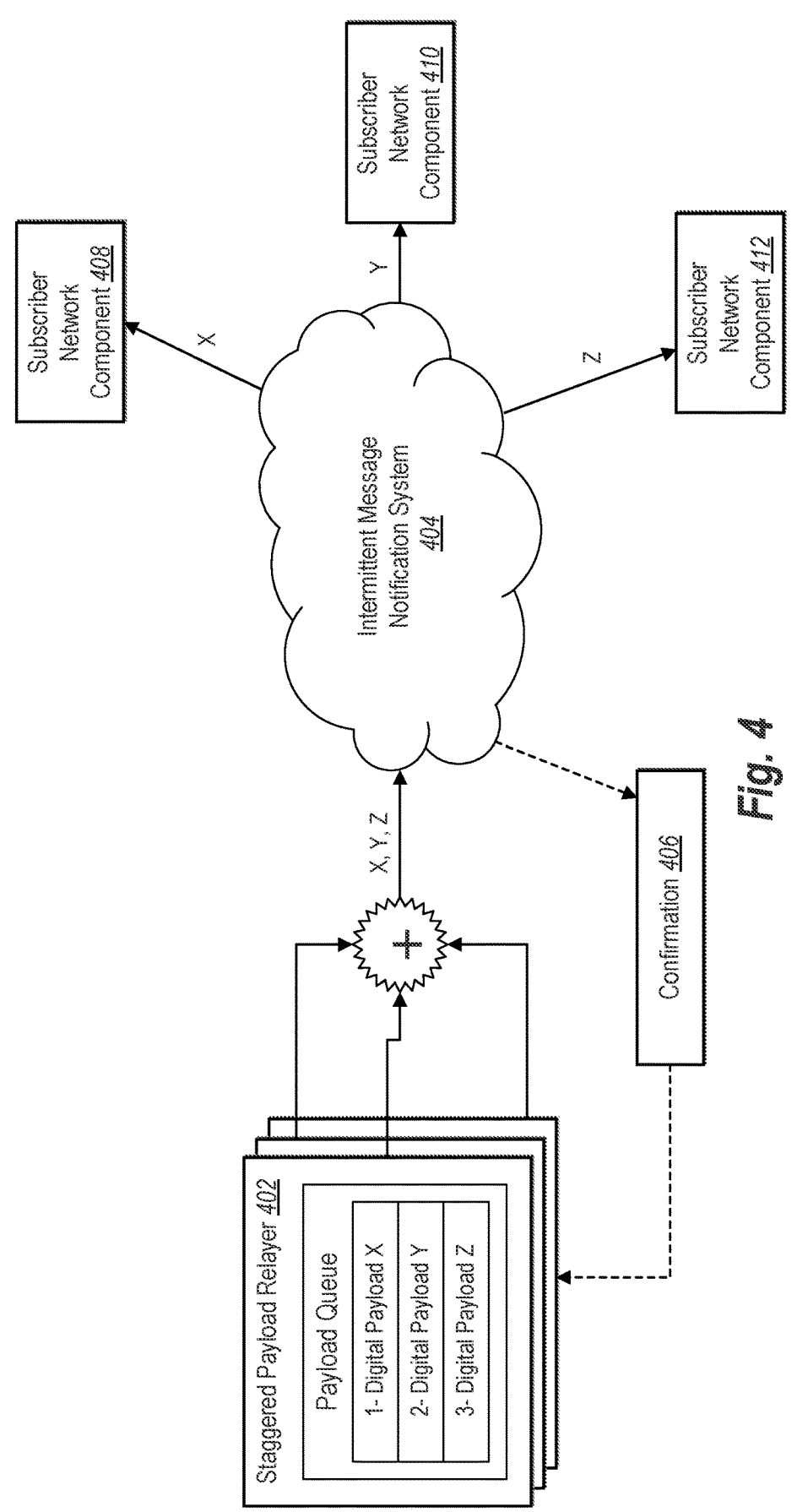
FIG. 4 illustrates an example diagram for distributing concurrent payload groups using a staggered payload relayer and an intermittent message notification system in accordance with one or more embodiments.

As mentioned above, in certain described embodiments, the payload pipeline system 102 resolves latency issues and improves throughput over prior systems. In particular, the payload pipeline system 102 can generate and distribute concurrent payload groups using a staggered payload relayer to facilitate parallel payload delivery for improved throughput. FIG. 4 illustrates generating and distributing a concurrent payload group in accordance with one or more embodiments.

Researchers have indicated that using staggered queuing and delivery of digital payloads (e.g., via SNS and SQS), as opposed to using data streams, might result in latency issues in some use cases. For instance, some prior SNS and SQS based systems provide messages using a single API call at a time. Over many network components with high volumes of messages, single message transmission can result in prior systems generating large backlogs with high latency and low throughput (especially using certain programming languages such as RUBY). For instance, latency becomes especially problematic in prior systems that process single payloads at a time, the system submits API calls one at a time and waits for confirmations on each API call before proceeding to the next.

However, by intelligently generating concurrent payload groups (a unique function for SNS/SQS systems in AWS), the payload pipeline system 102 can circumvent latency problems to reduce latency and improve throughput, yielding unexpected results in the eyes of many researchers. Indeed, the payload pipeline system 102 can utilize a concurrent RUBY API to generate and distribute concurrent payload groups without sacrificing the low processing cost of staggered payload handling. Thus, the payload pipeline system 102 can use the staggered payload relayer 402 to generate and provide a concurrent payload group to the intermittent message notification system 404 (e.g., SNS) that includes multiple payloads at a time, thereby increasing throughput and reducing latency on a main processing thread (of RUBY) that might otherwise have downtime waiting for the next digital payload. By using concurrent payload groups, the payload pipeline system 102 likewise prevents buildup on the part of the staggered payload relayer 402 that might otherwise occur in prior single payload systems. In some embodiments, the staggered payload relayer 402 waits for the confirmation 406 (e.g., confirming successful delivery of digital payloads to respective network components) before proceeding to provide the next concurrent payload group.

As illustrated in FIG. 4, the payload pipeline system 102 utilizes multiple instances or containerized workers for a staggered payload relayer 402 to manage payload queues. In particular, the payload pipeline system 102 utilizes the different instances of the staggered payload relayer 402 to combine different digital payloads into a concurrent payload group. For example, the payload pipeline system 102 combines the digital payloads X, Y, and Z from different instances of the staggered payload relayer 402 into a concurrent payload group X, Y, Z to distribute via the intermittent message notification system 404. Thus, the payload pipeline system 102 can provide multiple digital payloads within a single message or a single transmission for distribution via the intermittent message notification system 404 (e.g., SNS). In some cases, the payload pipeline system 102 provides the digital payloads X, Y, and Z in parallel as a concurrent payload group for distribution via the intermittent message notification system 404. As discussed in further detail below, the payload pipeline system 102 can improve throughput by up to 100× (compared to single-payload-per-transmission systems) by utilizing concurrent payload groups.

As shown, the payload pipeline system 102 utilizes the intermittent message notification system 404 to distribute digital payloads to respective subscriber network components. Specifically, the payload pipeline system 102 determines which subscriber network components are subscribed as recipients for which digital payloads within the concurrent payload group. Additionally, the payload pipeline system 102 utilizes the staggered payload relayer 402 and the intermittent message notification system 404 to distribute the digital payloads accordingly. As shown, the payload pipeline system 102 provides the digital payload X to the subscriber network component 408, provides the digital payload Y to the subscriber network component 410, and provides the digital payload Z to the subscriber network component 412. In some cases, the payload pipeline system 102 generates and distributes a concurrent payload group that includes five or more digital payloads.

Figure 5:
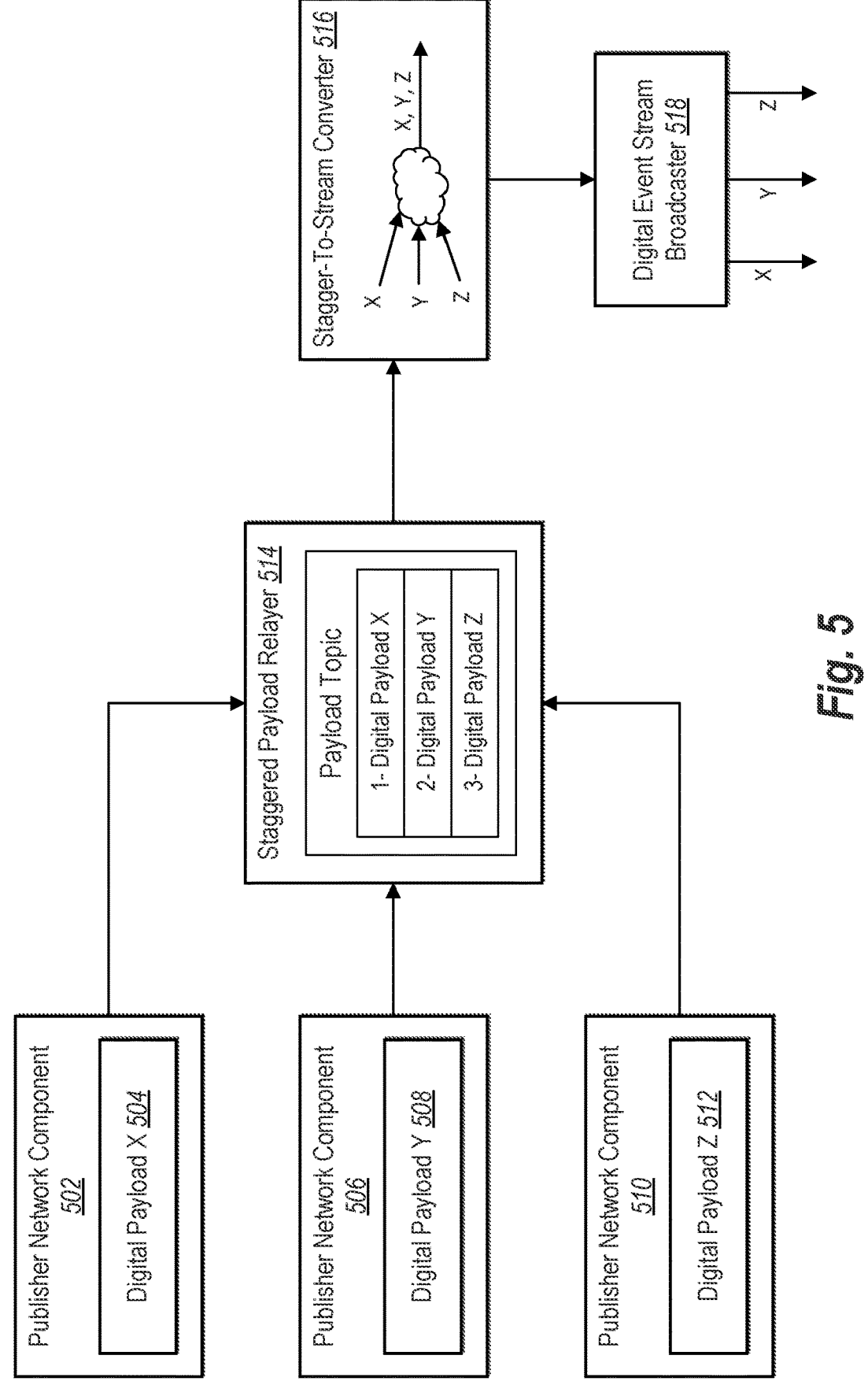
FIG. 5 illustrates an example diagram for using a stagger-to-stream converter to convert digital payloads within a payload queue into an event stream in accordance with one or more embodiments.

As mentioned above, in certain embodiments, the payload pipeline system 102 can convert staggered digital payloads into an event stream for distribution to network components. In particular, the payload pipeline system 102 can utilize a specialized function for a stagger-to-stream converter to convert staggered (e.g., SNS/SQS-based) digital payloads into a data stream (e.g., for distribution via KAFKA or KINESIS). FIG. 5 illustrates utilizing particular tooling for converting staggered payloads for distribution via an event stream in accordance with one or more embodiments.

As illustrated in FIG. 5, the payload pipeline system 102 receives digital payloads from a number of different publisher network components. In particular, the payload pipeline system 102 utilizes the staggered payload relayer 514 to receive the digital payload X 504 from the publisher network component 502, the digital payload Y 508 from the publisher network component 506, and the digital payload Z 512 from the publisher network component 510. As shown, the payload pipeline system 102 further uses the staggered payload relayer 514 to add the digital payloads to a payload queue.

As further illustrated in FIG. 5, in some embodiments, the payload pipeline system 102 provides the digital payloads from the payload queue using a technique other than the staggered, on-demand delivery of the intermittent message notification system (e.g., SNS). For example, the payload pipeline system 102 uses the staggered payload relayer 514 to provide one or more of the digital payloads within the payload queue to a stagger-to-stream converter 516. In turn, the stagger-to-stream converter 516 converts staggered digital payloads within the payload queue into (a format compatible with) an event stream or a data stream. In some cases, the stagger-to-stream converter 516 refers to a lambda function provided within a function library associated with AWS. In other cases, the stagger-to-stream converter 516 can refer to another type of converter.

Based on using the stagger-to-stream converter 516 to convert the digital payloads into an event stream or a data stream, the payload pipeline system 102 utilizes a digital event stream broadcaster 518 to broadcast the data stream. For instance, the digital event stream broadcaster 518 broadcasts a constant data stream for providing digital payloads to network components for performing events. Indeed, the network components used to execute some events may not be compatible with receiving staggered digital payloads via a payload queue of the staggered payload relayer 514, and the payload pipeline system thus converts the payload queue into an event stream for compatibility. In some cases, the digital event stream broadcaster 518 refers to a KAFKA or KINESIS system set up to broadcast a data stream of digital payloads for providing to downstream network components (e.g., via AWS).

In certain cases, the payload pipeline system 102 utilizes multiple instances of the stagger-to-stream converter 516. To elaborate, the payload pipeline system 102 can ingest many billions of digital payloads per month (e.g., ten billion or more), which requires the payload pipeline system 102 to process many thousands (e.g., four thousand or more) of digital payloads per second. On average, each event takes 200 milliseconds to write to the digital event stream broadcaster 518, which means that the payload pipeline system 102 can utilize many instances of the stagger-to-stream converter 516 (e.g., 1600 or more) to facilitate this volume.

Regarding latency, the payload pipeline system 102 enforces that a digital payload reach the digital event stream broadcaster 518 within a threshold time duration (e.g., within five seconds). To accomplish this, the payload pipeline system 102 utilizes the staggered payload relayer 514 with a publish latency of less than 20 milliseconds and a stagger-to-stream converter 516 with a latency of less than 100 milliseconds (for warm start, with an added second for cold start). In some cases, the payload pipeline system 102 may implement batch processing to reduce the number of invocations of the stagger-to-stream converter 516 and to reduce processing cost.

Figure 6:
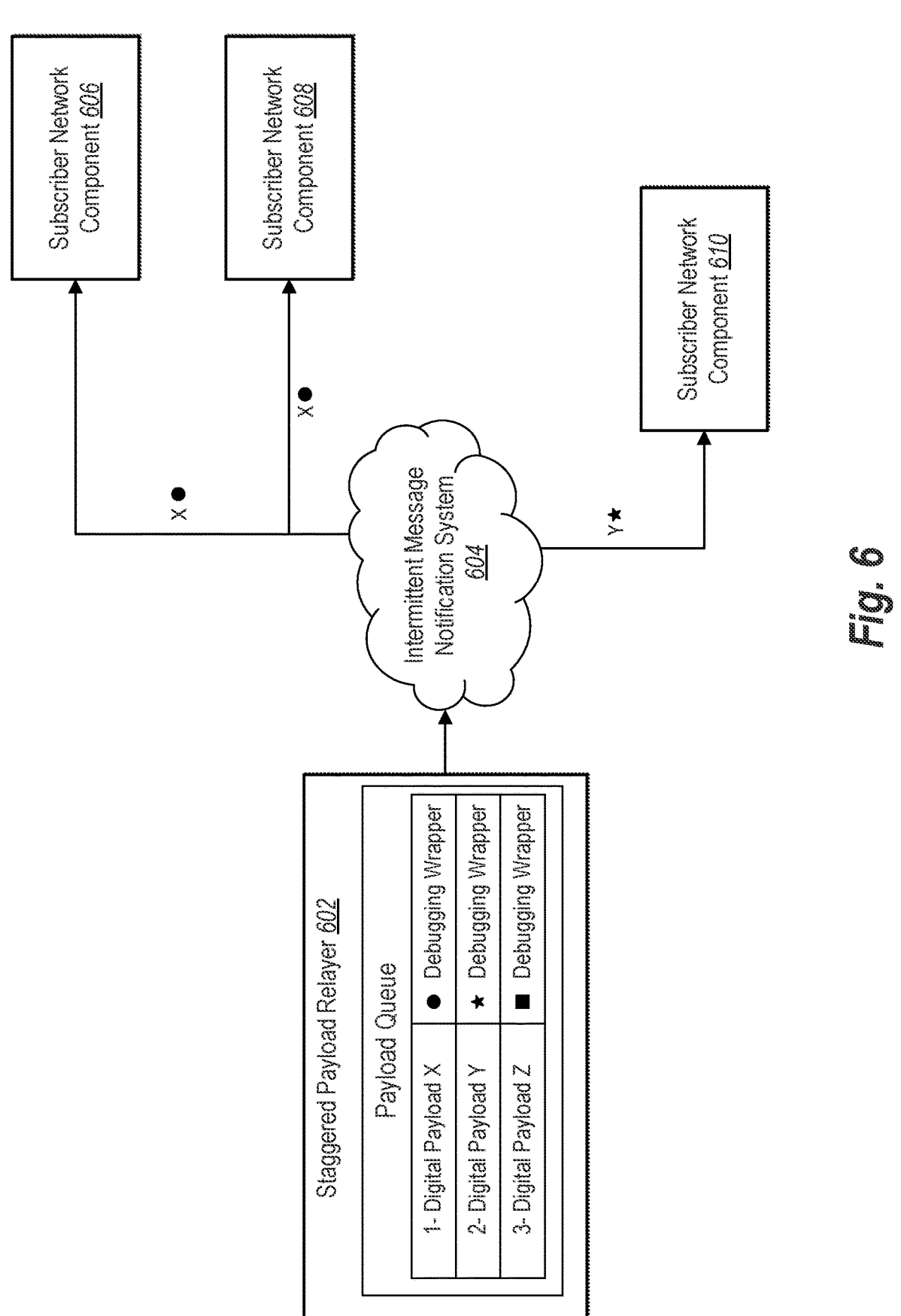
FIG. 6 illustrates an example diagram for generating debugging wrappers for tracing digital payloads in accordance with one or more embodiments.

As mentioned above, in certain embodiments, the payload pipeline system 102 improves debugging over prior systems. In particular, the payload pipeline system 102 improves debugging by generating specialized metadata in the form of debugging wrappers to link to digital payloads for traceability across different network components of the inter-network facilitation system 104. FIG. 6 generating and utilizing debugging wrappers for digital payloads in accordance with one or more embodiments.

As illustrated in FIG. 6, the payload pipeline system 102 utilizes a staggered payload relayer 602 to manage a payload queue. With a payload queue, the staggered payload relayer 602 handles three digital payloads: 1) Digital Payload X, 2) Digital Payload Y, and 3) Digital Payload Z. As shown, the payload pipeline system 102 further utilizes the staggered payload relayer 602 to annotate (or otherwise associate metadata with) the various digital payloads within the payload queue. For example, the payload pipeline system 102 generates a first debugging wrapper (illustrated as a dark circle) to accompany Digital Payload X. In addition, the payload pipeline system 102 generates a second debugging wrapper (illustrated as a star) to accompany Digital Payload Y. Further, the payload pipeline system 102 generates a third debugging wrapper (illustrated as a square) to accompany Digital Payload Z.

In one or more embodiments, the debugging wrappers are specialized metadata, such as payload (or schema) annotations, that are tied or linked to respective digital payloads. In addition, the debugging wrappers are unique from one another for improved traceability throughout the inter-network facilitation system 104. Further, the debugging wrappers can include information specific to the digital payloads to which they are linked (e.g., payload identifiers). In some cases, debugging wrappers are modifiable or evolving to change depending on where the corresponding digital payloads are located within the inter-network facilitation system. For instance, the payload pipeline system 102 updates location information within a debugging wrapper to indicate which network component published its digital payload (and when) and/or which network component(s) received or consumed its digital payload (and when). The debugging wrappers can also include information indicating what the digital payloads are related to (e.g., events or processes executed using the digital payloads).

As further illustrated in FIG. 6, the payload pipeline system 102 utilizes the staggered payload relayer 602 to distribute the digital payloads of the payload queue to subscriber network components. In particular, the staggered payload relayer 602 utilizes an intermittent message notification system 604 (e.g., SNS) to identify which network components are subscribed to which digital payloads and to distribute the digital payloads accordingly. For example, the payload pipeline system 102 utilizes the intermittent message notification system 604 to distribute Digital Payload X to subscriber network component 606 and to subscriber network component 608. In addition, the payload pipeline system 102 utilizes the intermittent message notification system 604 to distribute Digital Payload Y to subscriber network component 610.

As shown, when distributing the digital payloads to the respective subscriber network components, the payload pipeline system 102 provides the digital payloads within their associated debugging wrappers. Thus, the payload pipeline system 102 indicates, via the circle debugging wrapper, that Digital Payload X is distributed to subscriber network component 606 and to subscriber network component 608. The payload pipeline system 102 further indicates, via the star debugging wrapper, that Digital Payload Y is distributed to subscriber network component 610. Thus, if an error were to occur involving Digital Payload X or Digital Payload Y, the payload pipeline system 102 can quickly identify and signal payload paths—to indicate publisher network components that send the digital payloads and subscriber network components that consume the digital payloads.

In one or more embodiments, the payload pipeline system 102 utilizes the debugging wrappers to facilitate monitoring and alerting for certain situations. For example, the payload pipeline system 102 can generate and provide an alert or a notification (e.g., to an administrator device) when a payload queue increases in size and/or exceeds a threshold size/volume of digital payloads (by monitoring debugging wrappers for digital payloads within the queue). As another example, the payload pipeline system 102 generates and provides an alert notification for a digital payload that expires (or is within a threshold time period of expiration) within the digital payload (based on monitoring its debugging wrapper). Indeed, the payload pipeline system 102 can monitor an age of the oldest digital payload within a payload queue (as indicated by its debugging wrapper) and/or a number of messages within the queue.

In some embodiments, the payload pipeline system 102 identifies or determines buildups or backlogs of digital payloads at various locations within the inter-network facilitation system 104. For example, the payload pipeline system 102 monitors digital payloads using debugging wrappers to identify backlogs at subscriber network components that are not properly (or quickly enough) consuming digital payloads. The payload pipeline system 102 can further generate an alert notifying of such a backlog. By using monitoring and alerting from the debugging wrappers, the payload pipeline system 102 can reduce or prevent buildup or backlogs of digital payloads. For example, the payload pipeline system 102 can ensure that the staggered payload relayer 602 (or the intermittent message notification system 604) distributes digital payloads at a rate that matches or exceeds the rate of receiving and queuing the digital payloads.

Likewise, the payload pipeline system 102 can detect errors that occur with a digital payload, such as a delivery failure for sending a digital payload to a subscriber network component. For example, the payload pipeline system 102 monitors a debugging wrapper for a digital payload and throws an error upon determining that the digital payload either is either not consumed by the subscriber network component within a threshold period of time or that the subscriber network component does not (properly) execute a process using the digital payload within a threshold period of time. The payload pipeline system 102 can further generate and provide an alert for the delivery failure (or other error).

As mentioned above, in certain embodiments, the payload pipeline system 102 can improve efficiency over prior systems. In particular, the payload pipeline system 102 can utilize a staggered payload relayer that is lightweight as a result of implementing an intermittent message queue system and an intermittent message notification system (as opposed to an event stream) but that nevertheless achieves high throughput (unlike many prior SNS/SQS systems). Indeed, the payload pipeline system 102 can exhibit high throughput, low latency, and low downtime. FIG. 7. Illustrates example tables of experimental results for testing the throughput of the payload pipeline system 102 using various protocols.

As illustrated in FIG. 7, the various tables depict throughput statistics for the payload pipeline system 102 using synchronous and asynchronous payload handling. For example, the table 702 depicts experimental results of the payload pipeline system 102 using various numbers of threads (e.g., various instances of a staggered payload relayer) for synchronous communication, while handling digital payloads one at a time (e.g., sequentially or serially). As shown, the payload pipeline system 102 can achieve a throughput of up to 532 digital payloads per second with 16 threads for synchronous payload handling.

As further illustrated in FIG. 7, the table 704 depicts experimental results for the payload pipeline system 102 when implementing asynchronous payload handling for "single" payloads, where digital payloads are passed one at a time (e.g., sequentially or serially). As shown, the payload pipeline system 102 exhibits a throughput of 176 digital payloads per second for asynchronous, single payload processing.

Additionally, the table 706 depicts experimental results for the payload pipeline system 102 when implementing asynchronous payload handling for concurrent payloads, where multiple digital payloads are stacked or grouped for processing together. As described herein, the payload pipeline system 102 can generate concurrent payload groups for distribution to subscriber network components via an intermittent message queue system (e.g., SQS) and an intermittent message notification system (e.g., SNS). Indeed, the payload pipeline system 102 can generate a message or a transmission that includes multiple digital payloads for simultaneous or contemporaneous processing. In some cases, the payload pipeline system 102 utilizes the RUBY programming language and further implements a concurrent RUBY API for concurrent, asynchronous payload handling. As shown, the payload pipeline system 102 can achieve a throughput of 10,000 digital payloads per second for concurrent, asynchronous payload handling.

While the tables 702-706 depict various timing results for publishing processing time, the payload pipeline system 102 can also improve other timings. For instance, because the payload pipeline system 102 uses a staggered payload relayer based on an intermittent message queue system, the payload pipeline system 102 can exhibit a constant (within a variation tolerance) subscriber dequeue time (e.g., the time to dequeue a digital payload from a staggered payload relayer using an intermittent message queue system). In addition, the payload pipeline system 102 can provide a fast subscriber worker processing time (e.g., a time for a subscriber network component to complete a process for an event) by using a staggered payload relayer to distribute universally compatible (e.g., PROTOBUF) digital payloads.

The components of the payload pipeline system 102 can include software, hardware, or both. For example, the components of the payload pipeline system 102 can include one or more instructions stored on a computer-readable storage medium and executable by processors of one or more computing devices (e.g., the server(s) 106, the client device 118, and/or a third-party device). When executed by the one or more processors, the computer-executable instructions of the payload pipeline system 102 can cause a computing device to perform the methods described herein. Alternatively, the components of the payload pipeline system 102 can comprise hardware, such as a special purpose processing device to perform a certain function or group of functions. Additionally or alternatively, the components of the payload pipeline system 102 can include a combination of computer-executable instructions and hardware.

Furthermore, the components of the payload pipeline system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the payload pipeline system 102 may be implemented as part of a stand-alone application on a personal computing device or a mobile device. Alternatively or additionally, the components of the payload pipeline system 102 may be implemented in any application that allows creation and delivery of financial and/or marketing content to users, including, but not limited to, various applications.

FIGS. 1-7, the corresponding text, and the examples provide a number of different systems, methods, and non-transitory computer readable media for utilizing a staggered payload relayer to facilitate seamless processing of digital payloads across network components. In addition to the foregoing, embodiments can also be described in terms of flowcharts comprising acts for accomplishing a particular result. For example, FIG. 8 illustrates a flowchart of an example sequence of acts in accordance with one or more embodiments.

Figure 8:
FIG. 8 illustrates an example series of acts for relaying digital payloads from publisher network components to subscriber network components using a staggered payload relayer in accordance with one or more embodiments.
Figure 8:
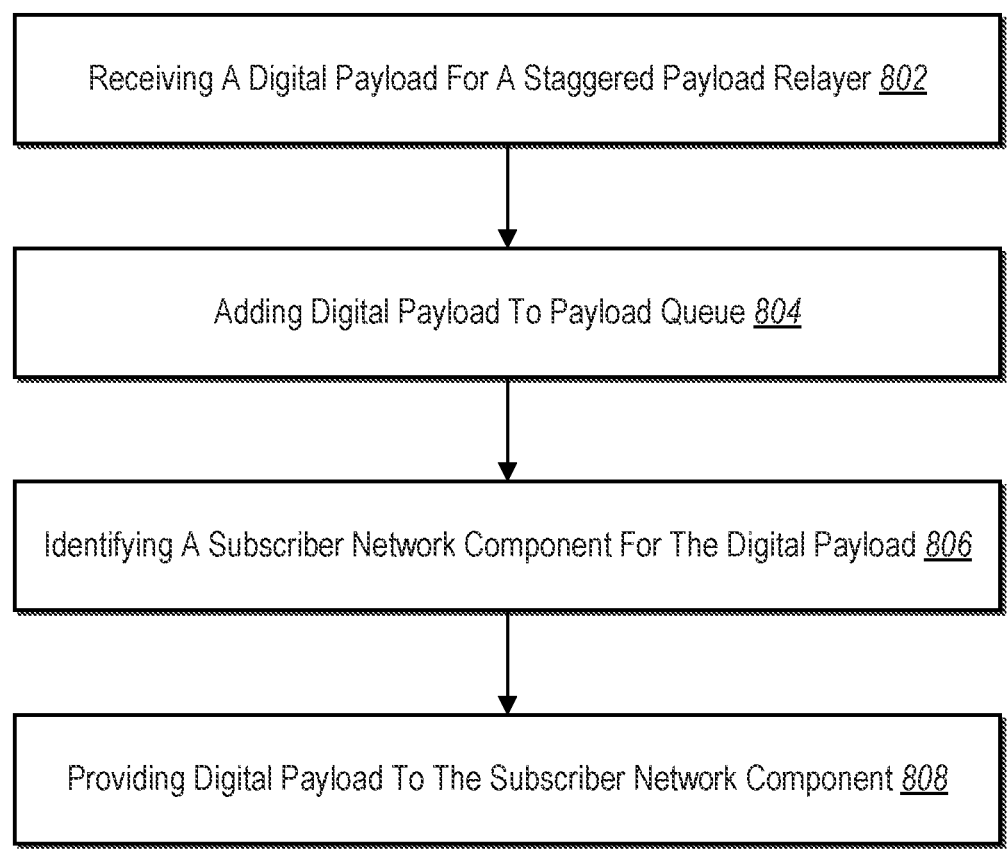

While FIG. 8 illustrates acts according to some embodiments, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 for publishing and distributing digital payloads using a staggered payload relayer. The series of acts 800 can include acts 802-808. The act 802 can involve receiving a digital payload for a staggered payload relayer. The act 804 can involve adding a digital payload to a payload queue. The act 806 can involve identifying a subscriber network component for the digital payload. The act 808 can involve providing the digital payload to the subscriber network component.

In one or more embodiments, the series of acts 800 includes receiving, from a publisher network component, a digital payload for a staggered payload relayer hosted on a server to relay. In one or more embodiments, the series of acts 800 includes adding the digital payload to a payload queue maintained by the staggered payload relayer and comprising a plurality of digital payloads received from various publisher network components. Additionally, the series of acts 800 can include identifying a subscriber network component subscribed to receive the digital payload from the payload queue. Further, the series of acts 800 can include, in response to identifying the subscriber network component, providing the digital payload to the subscriber network component subscribed to receive the digital payload.

The series of acts 800 can include facilitating publication of digital payloads within the payload queue utilizing the staggered payload relayer as an intermittent message queue system for staggered payload queuing and facilitating subscription to the digital payloads within the payload queue utilizing the staggered payload relayer as an intermittent message notification system for staggered payload distribution. In one or more embodiments, the series of acts 800 includes generating a concurrent payload group by combining multiple digital payloads from the payload queue together and providing the concurrent payload group to an intermittent message notification system within a single transmission to distribute the multiple digital payloads to subscriber network components.

In certain embodiments, the series of acts 800 includes converting staggered digital payloads within the payload queue to a payload stream utilizing a stagger-to-stream converter and providing the payload stream to a payload stream broadcaster for broadcasting the payload stream to network components. In these or other embodiments, the series of acts 800 includes utilizing the staggered payload relayer to perform synchronous payload transmission by, in response to providing the digital payload to the subscriber network component, waiting for a confirmation from the subscriber network component before providing a subsequent digital payload and utilizing the staggered payload relayer to perform asynchronous payload transmission by providing the digital payload to the subscriber network component without waiting for a confirmation from the subscriber network component.

In some cases, the series of acts 800 involves generating a debugging wrapper utilizing the staggered payload relayer to include as part of the digital payload and providing the debugging wrapper with the digital payload for tracing the digital payload among network components. Additionally, the series of acts 800 can include maintaining the digital payload within the payload queue of the staggered payload relayer for a set duration.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
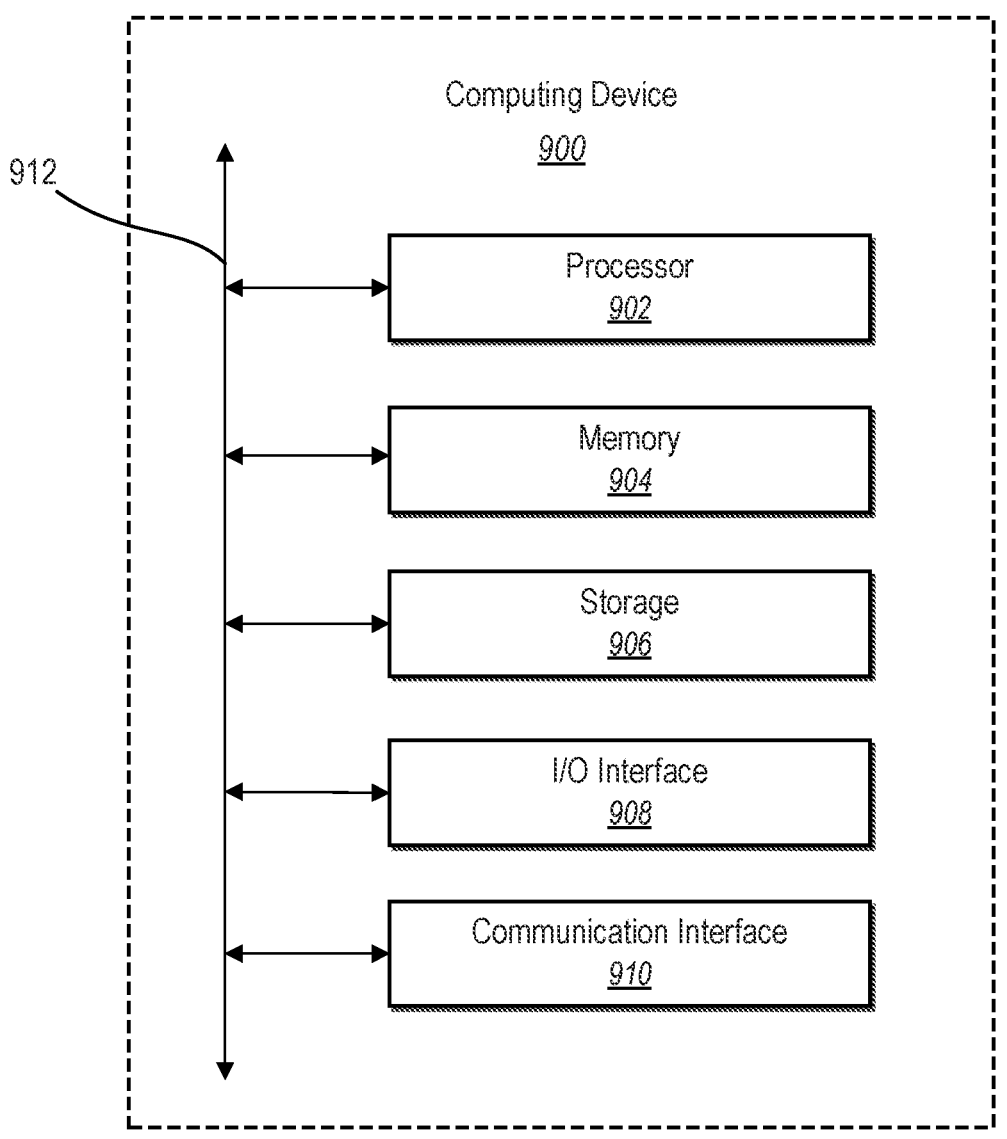
FIG. 9 illustrates a block diagram of a computing device for implementing one or more embodiments of the present disclosure.

FIG. 9 illustrates, in block diagram form, an exemplary computing device 900 (e.g., the client device 118, or the server(s) 106) that may be configured to perform one or more of the processes described above. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive ("HDD"), flash memory, a Universal Serial Bus ("USB") drive or a combination of these or other storage devices.

The computing device 900 also includes one or more input or output interface 908 (or "I/O interface 908"), which are provided to allow a user (e.g., requester or provider) to provide input to (such as user strokes), receive output from, and otherwise transfer data to and from the computing device 900. These I/O interface 908 may include a mouse, keypad or a keyboard, a touch screen, camera, optical scanner, network interface, modem, other known I/O devices or a combination of such I/O interface 908. The touch screen may be activated with a stylus or a finger.

The I/O interface 908 may include one or more devices for presenting output to a user, including, but not limited to, a graphics engine, a display (e.g., a display screen), one or more output providers (e.g., display providers), one or more audio speakers, and one or more audio providers. In certain embodiments, interface 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can comprise hardware, software, or both that connects components of computing device 900 to each other.

Figure 10:
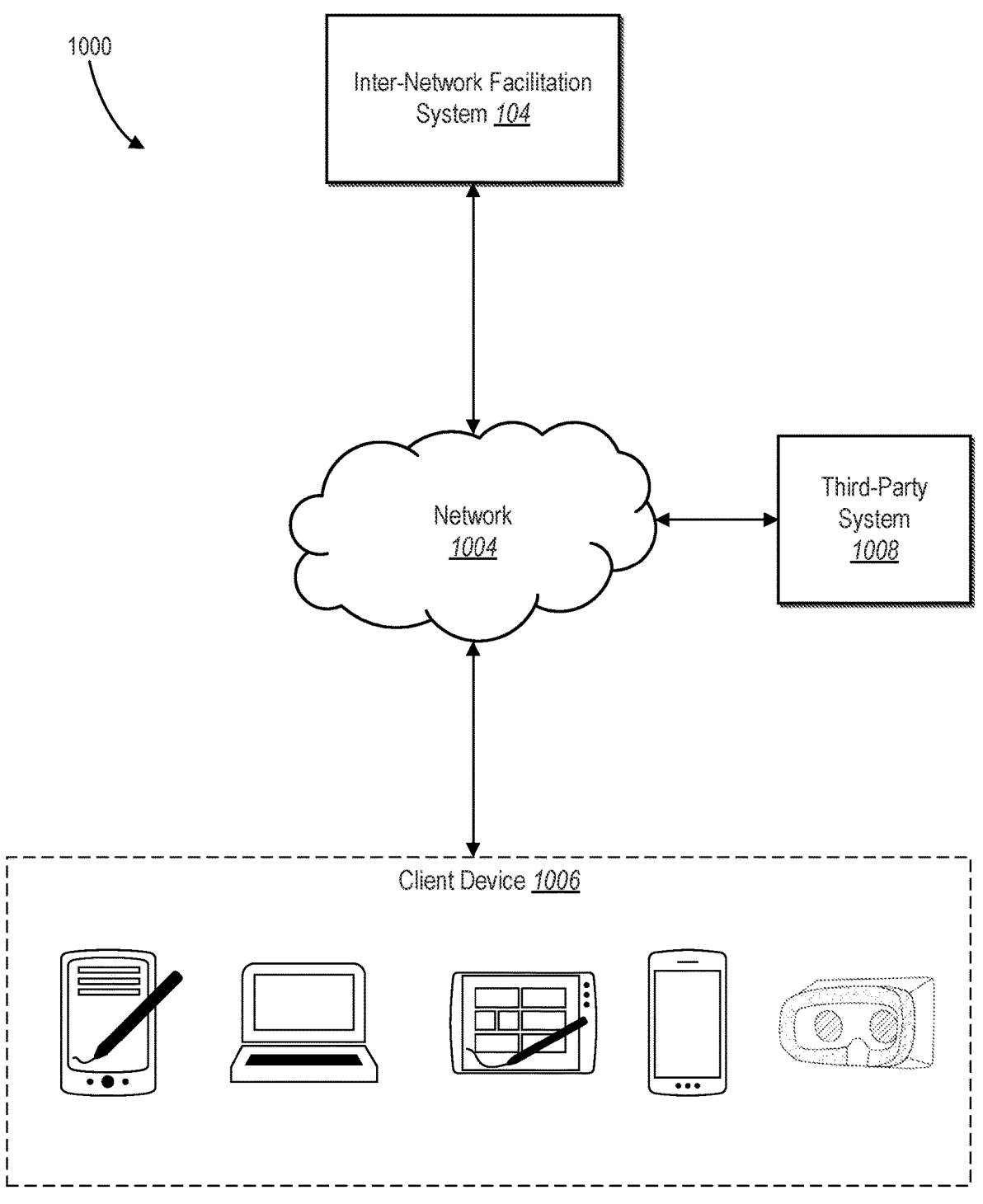
FIG. 10 illustrates an example environment for an inter-network facilitation system in accordance with one or more embodiments.

FIG. 10 illustrates an example network environment 1000 of the inter-network facilitation system 104. The network environment 1000 includes a client device 1006 (e.g., client device 118), an inter-network facilitation system 104, and a third-party system 1008 (e.g., the third-party system 116) connected to each other by a network 1004. Although FIG. 10 illustrates a particular arrangement of the client device 1006, the inter-network facilitation system 104, the third-party system 1008, and the network 1004, this disclosure contemplates any suitable arrangement of client device 1006, the inter-network facilitation system 104, the third-party system 1008, and the network 1004. As an example, and not by way of limitation, two or more of client device 1006, the inter-network facilitation system 104, and the third-party system 1008 communicate directly, bypassing network 1004. As another example, two or more of client device 1006, the inter-network facilitation system 104, and the third-party system 1008 may be physically or logically co-located with each other in whole or in part.

Moreover, although FIG. 10 illustrates a particular number of client devices 1006, inter-network facilitation systems 104, third-party systems 1008, and networks 1004, this disclosure contemplates any suitable number of client devices 1006, inter-network facilitation system 104, third-party systems 1008, and networks 1004. As an example, and not by way of limitation, network environment 1000 may include multiple client devices 1006, inter-network facilitation system 104, third-party systems 1008, and/or networks 1004.

This disclosure contemplates any suitable network 1004. As an example, and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006, the inter-network facilitation system 104 (which hosts the payload pipeline system 102), and third-party system 1008 to network 1004 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by client device 1006. As an example, and not by way of limitation, a client device 1006 may include any of the computing devices discussed above in relation to FIG. 9. A client device 1006 may enable a network user at the client device 1006 to access network 1004. A client device 1006 may enable its user to communicate with other users at other client devices 1006.

In particular embodiments, the client device 1006 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1006 one or more Hyper Text Markup Language ("HTML") files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1004) to link the third-party system 1008. For example, the inter-network facilitation system 104 may receive authentication credentials from a user to link a third-party system 1008 such as an online banking system to link an online bank account, credit account, debit account, or other financial account to a user account within the inter-network facilitation system 104. The inter-network facilitation system 104 can subsequently communicate with the third-party system 1008 to detect or identify balances, transactions, withdrawal, transfers, deposits, credits, debits, or other transaction types associated with the third-party system 1008. The inter-network facilitation system 104 can further provide the aforementioned or other financial information associated with the third-party system 1008 for display via the client device 1006. In some cases, the inter-network facilitation system 104 links more than one third-party system 1008, receiving account information for accounts associated with each respective third-party system 1008 and performing operations or transactions between the different systems via authorized network connections.

In particular embodiments, the inter-network facilitation system 104 may interface between an online banking system and a credit processing system via the network 1004. For example, the inter-network facilitation system 104 can provide access to a bank account of a third-party system 1008 and linked to a user account within the inter-network facilitation system 104. Indeed, the inter-network facilitation system 104 can facilitate access to, and transactions to and from, the bank account of the third-party system 1008 via a client application of the inter-network facilitation system 104 on the client device 1006. The inter-network facilitation system 104 can also communicate with a credit processing system, an ATM system, and/or other financial systems (e.g., via the network 1004) to authorize and process credit charges to a credit account, perform ATM transactions, perform transfers (or other transactions) between user accounts or across accounts of different third-party systems 1008, and to present corresponding information via the client device 1006.

In particular embodiments, the inter-network facilitation system 104 includes a model (e.g., a machine learning model) for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1008), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1000 either directly or via network 1004. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or an inter-network facilitation system 104 to manage, retrieve, modify, add, or delete, the information stored in a data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1004.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1006. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from client device 1006 responsive to a request received from client device 1006. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1006 associated with users.

In addition, the third-party system 1008 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1004. A third-party system 1008 can communicate with the inter-network facilitation system 104 to provide financial information pertaining to balances, transactions, and other information, whereupon the inter-network facilitation system 104 can provide corresponding information for display via the client device 1006. In particular embodiments, a third-party system 1008 communicates with the inter-network facilitation system 104 to update account balances, transaction histories, credit usage, and other internal information of the inter-network facilitation system 104 and/or the third-party system 1008 based on user interaction with the inter-network facilitation system 104 (e.g., via the client device 1006). Indeed, the inter-network facilitation system 104 can synchronize information across one or more third-party systems 1008 to reflect accurate account information (e.g., balances, transactions, etc.) across one or more networked systems, including instances where a transaction (e.g., a transfer) from one third-party system 1008 affects another third-party system 1008.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
at least one processor; and
a non-transitory computer readable medium comprising instructions that, when executed by the at least one processor, cause the system to:
receive, from a publisher network component of a network-based system comprising a plurality of compartmentalized network components comprising executable server software dedicated to performing respective functions of the network-based system, a digital payload for a staggered payload relayer hosted on a server to relay, the publisher network component comprising a network component of the plurality of compartmentalized network components that generates or provides the digital payload;
add the digital payload to a payload queue maintained by the staggered payload relayer and comprising a plurality of digital payloads received from various publisher network components of the network-based system;
identify, within the network-based system, a subscriber network component subscribed to receive the digital payload from the payload queue; and
provide, in response to identifying the subscriber network component and utilizing the staggered payload relayer, the digital payload to the subscriber network component subscribed to receive the digital payload via staggered payload distribution.

2. The system of claim 1, further comprising instructions that, when executed by the at least one processor, cause the system to:
facilitate publication of digital payloads within the payload queue utilizing the staggered payload relayer as an intermittent message queue system for staggered payload queuing; and
facilitate subscription to the digital payloads within the payload queue utilizing the staggered payload relayer as an intermittent message notification system for staggered payload distribution.

3. The system of claim 1, further comprising instructions that, when executed by the at least one processor, cause the system to:

generate a concurrent payload group by combining multiple digital payloads from the payload queue together; and provide the concurrent payload group to an intermittent message notification system within a single transmission to distribute the multiple digital payloads to subscriber network components.

4. The system of claim 1, further comprising instructions that, when executed by the at least one processor, cause the system to:

convert staggered digital payloads within the payload queue to a payload stream utilizing a stagger-to-stream converter; and provide the payload stream to a payload stream broadcaster for broadcasting the payload stream to network components.

5. The system of claim 1, further comprising instructions that, when executed by the at least one processor, cause the system to:

utilize the staggered payload relayer to perform synchronous payload transmission by, in response to providing the digital payload to the subscriber network component, waiting for a confirmation from the subscriber network component before providing a subsequent digital payload; or utilize the staggered payload relayer to perform asynchronous payload transmission by providing the digital payload to the subscriber network component without waiting for a confirmation from the subscriber network component.

6. The system of claim 1, further comprising instructions that, when executed by the at least one processor, cause the system to:

generate a debugging wrapper utilizing the staggered payload relayer to include as part of the digital payload; and provide the debugging wrapper with the digital payload for tracing the digital payload among network components.

7. The system of claim 1, further comprising instructions that, when executed by the at least one processor, cause the system to maintain the digital payload within the payload queue of the staggered payload relayer for a set duration.

8. A method comprising:

receiving, from a publisher network component of a network-based system comprising a plurality of compartmentalized network components comprising executable server software dedicated to performing respective functions of the network-based system, a digital payload for a staggered payload relayer hosted on a server to relay, the publisher network component comprising a network component of the plurality of compartmentalized network components that generates or provides the digital payload;

adding the digital payload to a payload queue maintained by the staggered payload relayer and comprising a plurality of digital payloads received from various publisher network components of the network-based system;

identifying, within the network-based system, a subscriber network component subscribed to receive the digital payload from the payload queue; and providing, in response to identifying the subscriber network component and utilizing the staggered payload relayer, the digital payload to the subscriber network component subscribed to receive the digital payload via staggered payload distribution.

9. The method of claim 8, further comprising:

facilitating publication of digital payloads within the payload queue utilizing the staggered payload relayer as an intermittent message queue system for staggered payload queuing; and facilitating subscription to the digital payloads within the payload queue utilizing the staggered payload relayer as an intermittent message notification system for staggered payload distribution.

10. The method of claim 8, further comprising:

generating a concurrent payload group by combining multiple digital payloads from the payload queue together; and providing the concurrent payload group to an intermittent message notification system within a single transmission to distribute the multiple digital payloads to subscriber network components.

11. The method of claim 8, further comprising:

converting staggered digital payloads within the payload queue to a payload stream utilizing a stagger-to-stream converter; and providing the payload stream to a payload stream broadcaster for broadcasting the payload stream to network components.

12. The method of claim 8, further comprising:

utilizing the staggered payload relayer to perform synchronous payload transmission by, in response to providing the digital payload to the subscriber network component, waiting for a confirmation from the subscriber network component before providing a subsequent digital payload; or utilizing the staggered payload relayer to perform asynchronous payload transmission by providing the digital payload to the subscriber network component without waiting for a confirmation from the subscriber network component.

13. The method of claim 8, further comprising:

generating a debugging wrapper utilizing the staggered payload relayer to include as part of the digital payload; and providing the debugging wrapper with the digital payload for tracing the digital payload among network components.

14. The method of claim 8, further comprising maintaining the digital payload within the payload queue of the staggered payload relayer for a set duration.

15. A non-transitory computer readable medium comprising instructions that, when executed by at least one processor, cause a computing device to:

receive, from a publisher network component of a network-based system comprising a plurality of compartmentalized network components comprising executable server software dedicated to performing respective functions of the network-based system, a digital payload for a staggered payload relayer hosted on a server to relay, the publisher network component comprising a network component of the plurality of compartmentalized network components that generates or provides the digital payload;

add the digital payload to a payload queue maintained by the staggered payload relayer and comprising a plurality of digital payloads received from various publisher network components of the network-based system;

identify, within the network-based system, a subscriber network component subscribed to receive the digital payload from the payload queue; and provide, in response to identifying the subscriber network component and utilizing the staggered payload relayer, the digital payload to the subscriber network component subscribed to receive the digital payload via staggered payload distribution.

16. The non-transitory computer readable medium of claim 15, further comprising instructions that, when executed by the at least one processor, cause the computing device to:

facilitate publication of digital payloads within the payload queue utilizing the staggered payload relayer as an intermittent message queue system for staggered payload queuing; and facilitate subscription to the digital payloads within the payload queue utilizing the staggered payload relayer as an intermittent message notification system for staggered payload distribution.

17. The non-transitory computer readable medium of claim 15, further comprising instructions that, when executed by the at least one processor, cause the computing device to:

generate a concurrent payload group by combining multiple digital payloads from the payload queue together; and provide the concurrent payload group to an intermittent message notification system within a single transmission to distribute the multiple digital payloads to subscriber network components.

18. The non-transitory computer readable medium of claim 15, further comprising instructions that, when executed by the at least one processor, cause the computing device to:

convert staggered digital payloads within the payload queue to a payload stream utilizing a stagger-to-stream converter; and provide the payload stream to a payload stream broadcaster for broadcasting the payload stream to network components.

19. The non-transitory computer readable medium of claim 15, further comprising instructions that, when executed by the at least one processor, cause the computing device to:

utilize the staggered payload relayer to perform synchronous payload transmission by, in response to providing the digital payload to the subscriber network component, waiting for a confirmation from the subscriber network component before providing a subsequent digital payload; or utilize the staggered payload relayer to perform asynchronous payload transmission by providing the digital payload to the subscriber network component without waiting for a confirmation from the subscriber network component.

20. The non-transitory computer readable medium of claim 15, further comprising instructions that, when executed by the at least one processor, cause the computing device to:

generate a debugging wrapper utilizing the staggered payload relayer to include as part of the digital payload; and provide the debugging wrapper with the digital payload for tracing the digital payload among network components.

* * * * *